(12) United States Patent
Kay et al.

(10) Patent No.: US 9,706,364 B2
(45) Date of Patent: Jul. 11, 2017

(54) ACCOUNTING FOR INDOOR-OUTDOOR TRANSITIONS DURING POSITION DETERMINATION

(71) Applicant: Microsoft Corporation, Redmond, WA (US)

(72) Inventors: Jonathan Kay, Redmond, WA (US); Chih-Wei Wang, Redmond, WA (US); Priyanka B. Vegesna, Redmond, WA (US); Jyh-Han Lin, Mercer Island, WA (US); Hiep Khuu, Issaquah, WA (US); Cristina del Amo Casado, Seattle, WA (US); David Hoover, Woodinville, WA (US); Stephen P. DiAcetis, Duvall, WA (US); Fernando Gonzalez, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 48 days.

(21) Appl. No.: 14/488,002

(22) Filed: Sep. 16, 2014

(65) Prior Publication Data

US 2016/0080911 A1    Mar. 17, 2016

(51) Int. Cl.
| | |
|---|---|
| *H04W 4/04* | (2009.01) |
| *H04W 4/02* | (2009.01) |
| *G01C 21/20* | (2006.01) |
| *G01S 19/48* | (2010.01) |
| *G01S 5/02* | (2010.01) |

(52) U.S. Cl.
CPC ............ *H04W 4/04* (2013.01); *G01C 21/206* (2013.01); *G01S 5/0263* (2013.01); *G01S 19/48* (2013.01); *H04W 4/021* (2013.01)

(58) Field of Classification Search
CPC ......... H04W 64/00; H04W 4/02; H04W 4/04; H04W 4/021; H04L 29/08657; G01S 5/0263; G01S 19/48; G01C 21/206

USPC ..................................................... 455/456.1
See application file for complete search history.

(56) References Cited

U.S. PATENT DOCUMENTS

| | | | |
|---|---|---|---|
| 8,457,502 B2 | 6/2013 | Ryan et al. | |
| 8,751,151 B2 | 6/2014 | Funk et al. | |
| 2007/0239813 A1 | 10/2007 | Pinder et al. | |
| 2013/0065604 A1 | 3/2013 | Werner et al. | |
| 2013/0137450 A1 | 5/2013 | Dai et al. | |

(Continued)

FOREIGN PATENT DOCUMENTS

| | | |
|---|---|---|
| WO | WO 2013074352 | 5/2013 |
| WO | WO 2014016602 | 1/2014 |

OTHER PUBLICATIONS

Leppakoski et al., "Pedestrian Navigation Based on Inertial Sensors, Indoor Map and Wlan Signals," in IEEE International Conference on Acoustics, Speech and Signal Processing, Mar. 25, 2012, pp. 1569-1572.

(Continued)

*Primary Examiner* — Nathan Mitchell
(74) *Attorney, Agent, or Firm* — Klarquist Sparkman, LLP

(57) ABSTRACT

A determination of whether a mobile computing device is indoors or outdoors can incorporate any of a variety of factors to make an efficient and accurate determination of indoor-outdoor status. Such a status can be useful for use in conjunction with positioning services. Features such as bounding boxes, activity determination, and the like can be used to strike a balance between power consumption and accuracy. A positive user experience with fewer false detections can result.

20 Claims, 12 Drawing Sheets

(56) References Cited

U.S. PATENT DOCUMENTS

| | | |
|---|---|---|
| 2013/0238857 A1 | 9/2013 | Daniel et al. |
| 2014/0045535 A1 | 2/2014 | Dai et al. |
| 2014/0114568 A1 | 4/2014 | Park |
| 2014/0171124 A1 | 6/2014 | Goglin |
| 2014/0192658 A1 | 7/2014 | Venkatraman et al. |
| 2014/0370909 A1 | 12/2014 | Natucci, Jr. et al. |
| 2015/0245180 A1 | 8/2015 | Lin et al. |

OTHER PUBLICATIONS

Gallagher et al., "Power Efficient Indoor/Outdoor Positioning Handover," In Proceedings International Conference on Indoor Positioning and Indoor Navigation, Sep. 21, 2011, 4 pages.

Perry, "Mapping from Wi-Fi Fingerprints Could Improve Indoor Navigation," IEEE Spectrum, Dec. 20, 2012, 2 pages.

International Preliminary Report on Patentability received in counterpart PCT Application No. PCT/US2015/049877, mailed Dec. 16, 2016, 8 pages.

Second Written Opinion received in counterpart PCT Application No. PCT/US2015/049877, mailed Jul. 11, 2016, 7 pages.

International Search Report and Written Opinion, from corresponding PCT Application No. PCT/US2015/049877, mailed Dec. 11, 2015, 13 pages.

ACCOUNTING FOR INDOOR-OUTDOOR TRANSITIONS DURING POSITION DETERMINATION

BACKGROUND

Mobile phones now have functionality and applications that provide useful location information. Such location information can be used for a variety of purposes, including navigating via digital maps.

A more recent development is the use of indoor positioning systems. Traditional positioning technologies such as GPS falter when a phone is moved indoors. However, indoor positioning systems can pick up where traditional technologies leave off. As a result, a phone can continue to provide a positive user experience, even when the phone is in an indoor venue such as an office building, store, transportation station, or the like.

However, there still remains a problem of determining whether the phone is actually indoors or outdoors. Because there can be significant challenges when making such a determination, there still remains room for improvement.

SUMMARY

The Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

An embodiment can be a method implemented at least in part by a computing device, the method comprising, via one or more initial indoor-outdoor-status-determining factors, determining an indoor-outdoor status indicating whether a mobile computing device is indoors or outdoors; detecting that the mobile computing device is approaching an indoor-outdoor transition; responsive to detecting that the mobile computing device is approaching the indoor-outdoor transition, collecting one or more additional indoor-outdoor-status-determining factors; and via the one or more additional indoor-outdoor-status-determining factors, confirming or rejecting the indoor-outdoor status.

An embodiment can be implemented as a mobile computing device comprising, in one or more computer-readable storage media, a position determination tool comprising an indoor-outdoor status tracker; wherein the position determination tool comprises a stored indoor-outdoor status indicating whether the mobile computing device is indoors or outdoors; wherein the indoor-outdoor status tracker comprises a stored indoor-outdoor transition indicator indicating whether the mobile computing device is transitioning between an indoor and an outdoor status; wherein the indoor-outdoor status tracker accepts one or more initial indoor-outdoor-status-determining factors as input for adjusting the stored indoor-outdoor status; and wherein the indoor-outdoor status tracker is operable to request one or more additional indoor-outdoor-status-determining factors as input when the indoor-outdoor transition indicator indicates a transition; and the indoor-outdoor status tracker is operable to confirm or reject the indoor-outdoor status based on the one or more additional indoor-outdoor-status-determining factors.

An embodiment can be implemented as one or more computer-readable media comprising computer-executable instructions causing a mobile computing device to perform a method comprising, storing a representation of a bounding box; receiving a current position of the mobile computing device as determined by a first positioning service interpreting data provided by hardware of the mobile computing device; determining whether the current position of the mobile computing device is within the bounding box; responsive to determining that the current position of the mobile computing device is within the bounding box, activating a second positioning service; based on the current position of the mobile computing device as determined by the first positioning service and a current position of the mobile computing device as determined by a second positioning service, determining an indoor-outdoor status of the mobile computing device; and based on the determined indoor-outdoor status of the mobile computing device, deactivating a positioning service of the mobile computing device, whereby power consumption by the mobile computing device is reduced.

As described herein, a variety of other features and advantages can be incorporated into the technologies as desired.

DETAILED DESCRIPTION

Example 1—Example Overview

The technologies described herein can be used for a variety of indoor-outdoor transition scenarios, and adoption of the technologies can provide improved techniques for determining whether a mobile computing device is indoors or outdoors. Such a determination can be helpful when managing positioning technologies or services provided by the mobile computing device. A wide variety of collected factors can be supported to provide more accurate indoor-outdoor status determinations, provide faster indoor-outdoor determinations, and reduce the area in which indoor-outdoor status is uncertain.

Other features described herein can be implemented to improve transitions between indoor and outdoor locations. An overall superior user experience with smoother transitions between indoor and outdoor status can result, as well as overall better positioning information. Further advantages relate to power consumption conservation as described herein.

Various other features can be implemented and combined as described herein.

Example 2—Example System Accounting for Indoor-Outdoor Transitions

Figure 1:
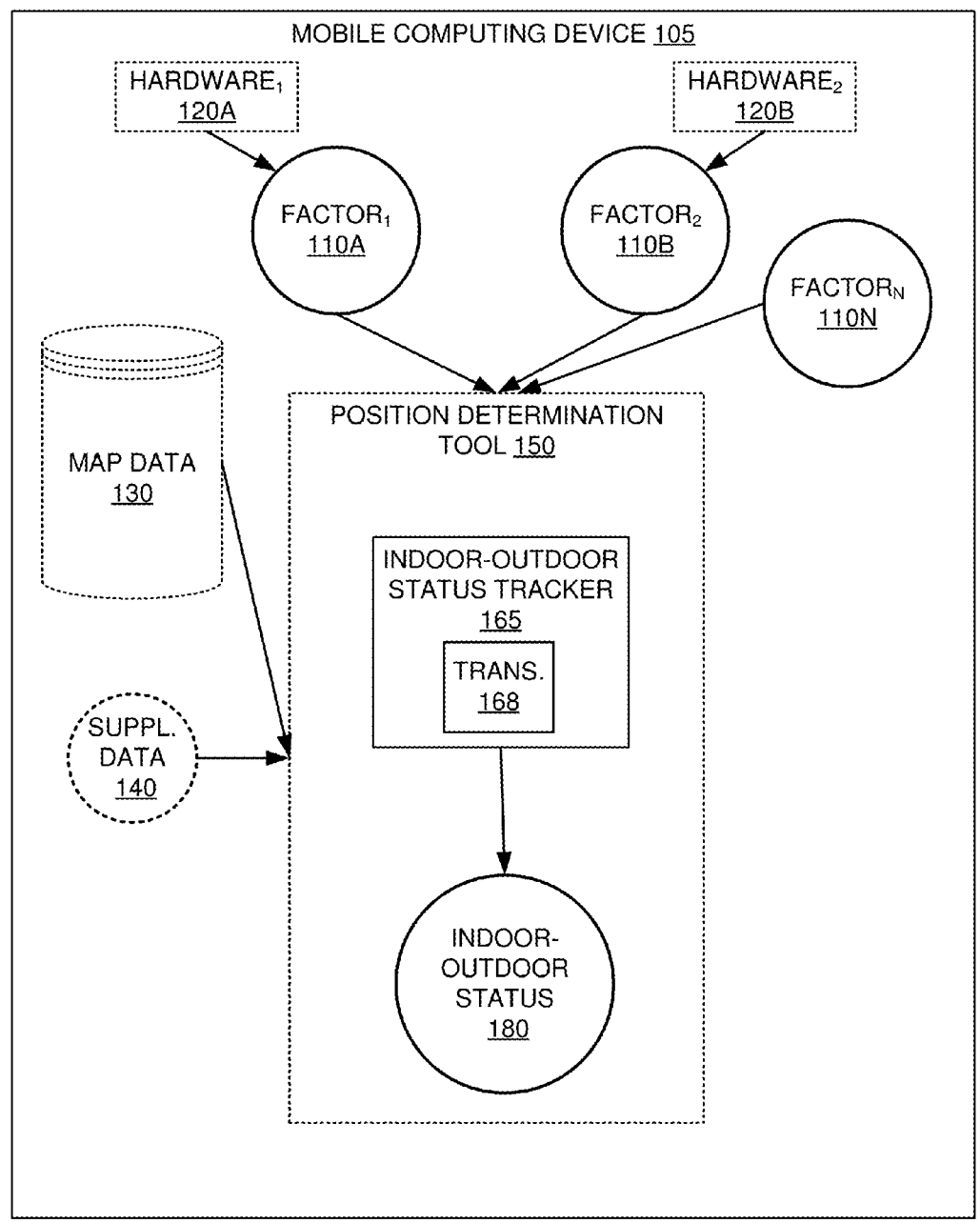
FIG. 1 is a block diagram of an example system accounting for indoor-outdoor transitions during position determination.

FIG. 1 is a block diagram of an example system 100 accounting for indoor-outdoor transitions during position determination. The position determination tool 150 itself is shown for context and can be implemented separately from or in conjunction with the described technologies. In the example, the position determination tool 150 includes an indoor-outdoor status tracker 165 that can receive a plurality of indoor-outdoor-status-determining factors 110A-N (e.g., via the position determination tool 150) to make a determination of the indoor-outdoor status 180 of the mobile device 105 (e.g., a stored status 180 indicating whether the device 105 is indoors or outdoors).

As shown, the factors 110A-N can be calculated based on data received from one or more respective hardware sensors 120A-B of the device 105. In practice, a sensor 120A-B can be used to determine one or more factors 110A-N, a particular factor (e.g., 110A) can draw from data detected by one or more sensors 120A-B, or the like.

As shown, the tracker 165 can store an indoor-outdoor transition indicator 168 that indicates whether an indoor-outdoor transition is approaching, whether a transition is occurring, or the like. As described herein, the tracker 165 can collect additional factors 110A-N based on when an indoor-outdoor transition is approaching or occurring.

As described herein, the indoor-outdoor status tracker 165 can accept (e.g., via the tool 150) one or more initial indoor-outdoor-status-determining factors as input for adjusting (e.g., determining) the stored indoor-outdoor status 180. The tracker 165 can request one or more additional indoor-outdoor-status-determining factors as input when the indoor-outdoor transition indicator 168 indicates a transition.

The tracker 165 is operable to confirm or reject the indoor-outdoor status 180 based on the one or more additional indoor-outdoor-status-determining factors. As described herein, the tracker 165 can be operable to progressively request one or more further indoor-outdoor-status-determining factors as input when the additional indoor-outdoor-status-determining factors do not conclusively confirm or reject the indoor-outdoor status (e.g., confirm indoor-outdoor status with low confidence).

Although not explicitly shown, the position determination tool 150 can ultimately generate a determined position of the mobile device 105. Such a position can take the form of a map location, latitude/longitude pair, floor, or the like. As described herein, such the determination of such a position can be improved when an accurate indoor-outdoor status 180 is detected, and/or when such a status 180 is detected more efficiently. For example, a position determination tool 150 can switch between different positioning systems (e.g., an indoor positioning system and an outdoor positioning system) based on the detected indoor-outdoor status 180. Further steps (e.g., proactively showing indoor maps when indoor status is detected) can be activated accordingly. Unused systems can be deactivated as described herein, resulting in reduced power consumption by the device 105.

The tool 150 can rely on map data 130, supplemental data 140, or the like. For example, user preferences or the like can be used to affect operation of the system 100. As described herein, a bounding polygon for a venue can be stored, and the transition indicator 168 can be set according to whether the device 105 is determined as being within the polygon.

In any of the examples herein, data that is shown as being in the device 105 can be stored in the device, or such data can be stored at, drawn from, and/or synchronized from other sources (e.g., a server, the cloud, or the like).

Client-server operation can be supported whereby a requesting application or circuitry on a mobile device provides observed factor information for input to a server or cloud and receives the status 180 or other information in response. In such a case, some information may reside outside of the requesting device. However, implementations where the information is downloaded or preloaded to a local device for consultation can also be supported.

Although various components are shown in separate boxes, in practice, component boundaries may vary. For example, the components can be provided as part of a mobile device operating system, map application, or the like. For example, the position determination tool 150 can be incorporated into or accessed by a location-based application or the like. Other arrangements are possible while still implementing the technologies.

In practice, the systems shown herein, such as system 100, can be more complicated, with additional functionality, more inputs, outputs, and the like. In practice, additional functionality related to location (e.g., GNSS, indoor positioning technology, or the like) can be included to determine a current location of a device that transitions to and from indoor and outdoor locations. Additionally, a specialized device primarily or fully dedicated to providing map functionality, can implement the described technologies. Further, any mobile device providing text-based or voice-activation status of entering/exiting a venue can implement the technologies.

The system 100 and any of the other systems described herein can be implemented in conjunction with any of the hardware components described herein, such as the computing systems or mobile devices described below (e.g., comprising one or more processors, memory, and the like). In any of the examples herein, the inputs, outputs, factors, indicators, statuses, positions, bounding polygons and applications can be stored in one or more computer-readable storage media or computer-readable storage devices. The technologies described herein can be generic to the specifics of operating systems or hardware and can be applied in any variety of environments to take advantage of the described features.

Example 3—Example Method Accounting for Indoor-Outdoor Transitions

Figure 2:
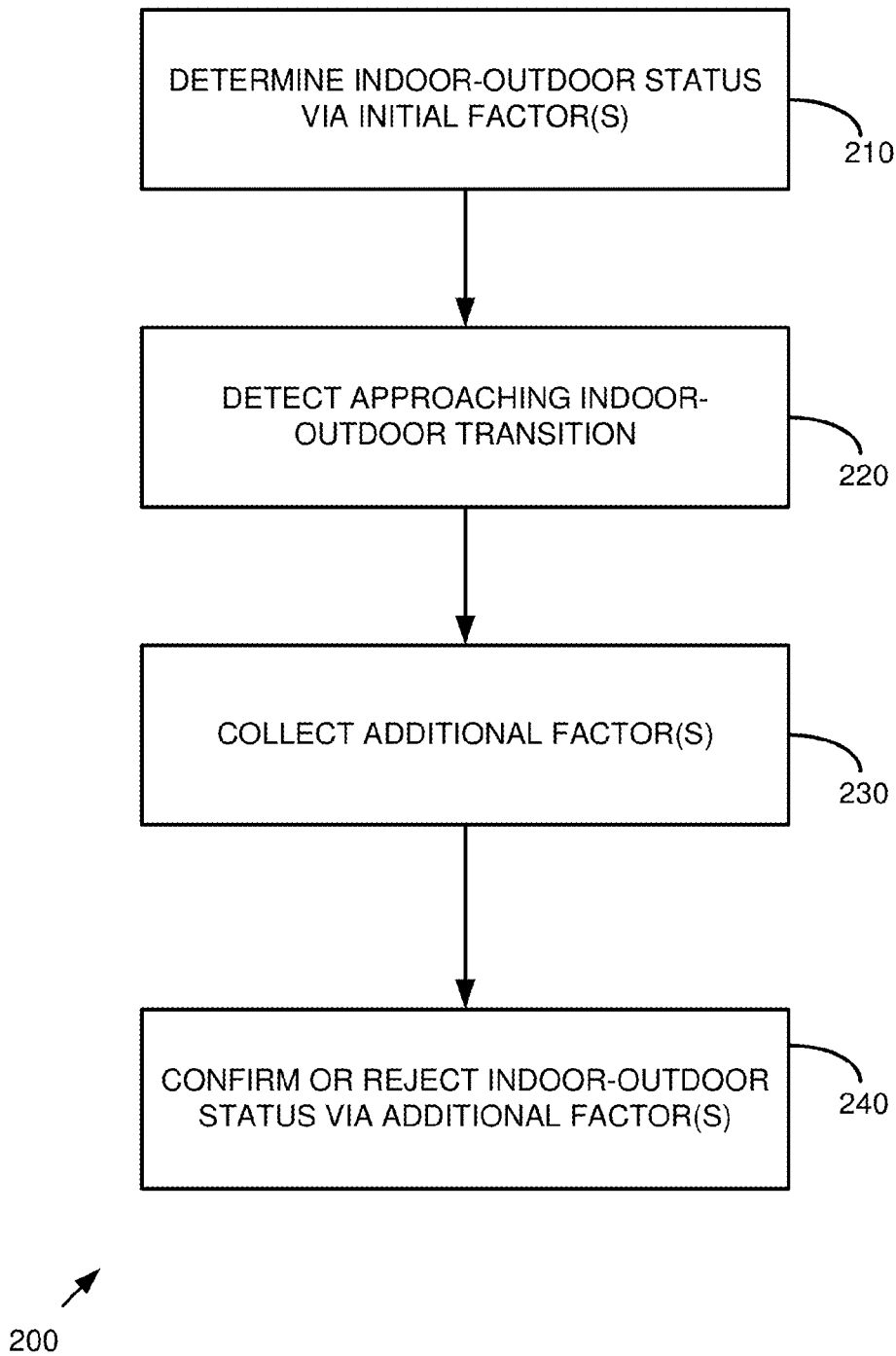
FIG. 2 is a flowchart of an example method implementing indoor-outdoor transitions during position determination.

FIG. 2 is a flowchart of an example method 200 implementing indoor-outdoor transitions during position determination and can be implemented, for example, in the system shown in FIG. 1.

The method 200 is typically performed as part of a position determination for a mobile device. In practice, a determination of indoor-outdoor status can be used to inform operation of position determination services. However, as described herein, other implementations can also be supported.

At 210, an indoor-outdoor status (e.g., indicating whether the mobile computing device is indoors or outdoors) is determined. As described herein, such a determination can be made via one or more initial indoor-outdoor-status-determining factors (e.g., any combination of one or more of the indoor-out-door-status-determining factors described herein). In an outdoor positioning scenario, determination can be made via GNSS (e.g., GPS) technologies, Wi-Fi detection adapted for outdoor positioning, or the like. When close to a building, GNSS and Wi-Fi in conjunction with a larger bounding box can be used to quickly determine indoor-outdoor status (e.g., with bounding box information for a given indoor venue). However, indoor positioning scenarios can also be supported (e.g., Wi-Fi detection adapted for indoor positioning or the like).

At 220, it is detected that the mobile computing device is approaching an indoor-outdoor transition. In practice, such a detection may be made after the device has actually already experienced such a transition. Having detected such an approaching transition, an indoor-outdoor status tracker can reflect that such a transition has been detected.

As described herein, a variety of techniques can be used to detect an approaching transition. For example, bounding polygons, Wi-Fi signals, any of the indoor-outdoor-status-determining factors, or combinations thereof can be used.

At 230, responsive to detecting that the mobile computing device is approaching a transition, one or more additional indoor-outdoor-status-determining factors can be collected. In practice, one or more services for collecting determination factors can be activated responsive to detecting the approaching transition. Subsequently, after data is collected from activated services (e.g., via sensors of the device), such services can be deactivated (e.g., after a determination of indoor-outdoor status has been made). As described herein, such an approach can reduce power consumption while maintaining an accurate determination of indoor-outdoor status.

As described herein, one or more further indoor-outdoor-status-determining factors can be progressively collected and incorporated into the indoor-outdoor status determination until a conclusive indoor-outdoor status is determined. In practice, two different factors may provide sufficient confidence in the status determination; however, additional factors can markedly increase confidence and accuracy of the determination without incurring undue power consumption.

At 240, the indoor-outdoor status is confirmed or rejected via the one or more additional indoor-outdoor-status-determining factors. The additional or further factors can override (e.g., trump) an earlier determination, be incorporated into the determination, or be used with a subset of the initial factors to make a refined determination.

The method 200 and any of the other methods described herein can be performed by computer-executable instructions (e.g., causing a computing system to perform the method) stored in one or more computer-readable media (e.g., storage or other tangible media) or stored in one or more computer-readable storage devices.

Such methods can be performed at least in part by any of the computing systems described herein (e.g., a mobile device, mobile computing device, or the like).

Example 4—Example Indoor-Outdoor Status

In any of the examples herein, an indoor-outdoor status of a mobile computing device can indicate whether the device is indoors or outdoors. In practice, an indoors location can be indicated when the device is inside a fixed structure such as a building. However, "indoors" can also be indicated when within a venue that is considered to be inside (e.g., even if in an open-sky venue with no roof, an "indoors" status can be indicated due to a determination that the device is within the venue), whether or not the venue includes a conventional building. An outdoors location can be indicated when the device is outside (e.g., of fixed structures such as buildings or venues). Although presence in a vehicle typically results in outdoor status, it is possible for presence in a vehicle to result in indoor status (e.g., when driving in a parking garage) as described herein.

In practice, the status determined by the technologies described herein may at times be incorrect (e.g., a determination is made that the device is indoors, but the device is actually physically outdoors or outside the indoor venue). However, by applying the technologies described herein, various benefits, including reducing false detections can be realized.

In addition to a simple status indicating "indoors" or "outdoors" (e.g., via a scalar, Boolean value, or the like), a confidence score can also be incorporated into the status. Such a confidence score can indicate an estimate of the probability that the status is correct.

As described herein, the status can be stored locally to the device, generated upon request from a call to a service (e.g., via an application programming interface), or the like.

Example 5—Example Indoor-Outdoor Transitions

In any of the examples, herein, an "indoor-outdoor" transition can involve a transition from an indoor location to an outdoor location or a transition from an outdoor location to an indoor location. In addition, at times, a device may move in and out of a building in a short period of time and then eventually settle inside or outside; such activity can result in multiple transitions or be treated as a single, logical transition.

As described herein, a transition status can be stored by the device to indicate whether the device is currently transitioning between statuses or whether the device is approaching such a transition. When the transition status indicates that a transition is taking place, additional services can be consulted (e.g., to collect additional factors) as described herein to confirm or reject an indoor-outdoor status determination.

Example 6—Example Detection of Approaching Transition

In any of the examples herein, various indoor-outdoor-status-determining factors can be consulted to determine whether the device is approaching an indoor-outdoor transition. As described herein, responsive to detection of such an approaching transition, additional steps can be taken, including collecting additional factors, further factors, or both.

Example 7—Example Confirmation or Rejection of Status

In any of the examples herein, a determined indoor-outdoor status can be confirmed or rejected. For example, a determination made via one or more initial indoor-outdoor-status-determining factors can be confirmed or rejected via additional indoor-outdoor-status-determining factors. Similarly, a service relying on such factors can confirm or reject a determination of indoor-outdoor status based on other services (e.g., the two services conflict or agree with respect to the indoor-outdoor status determination).

Confirmation or rejection can be done by iterating (e.g., and progressively collecting different factors) until a threshold confidence score is met. In other cases, simple agreement between two systems can indicate confirmation.

In some cases, further factors can be collected before a status is confirmed or rejected. For example, responsive to determining that the additional factors do not conclusively confirm or reject the status determination, further factors can be collected.

Example 8—Example Indoor-Outdoor-Status-Determining Factors

In any of the examples herein, a variety of indoor-outdoor-status-determining factors can be determined. Collection of such factors can be provided by a service, operating system, application, or the like that processes data provided by hardware (e.g., sensor, radio, and the like) of the mobile computing device to determine the factor.

Such factors can be used as indoor-outdoor-status-determining factors, additional indoor-outdoor-status-determining factors, further indoor-outdoor-status-determining factors, or the like.

As described herein, such factors can be used to determine when the device is approaching an indoor-outdoor transition and in making such a determination (e.g., such a determination can be based on one or more of the factors). On a general level, some factors can be useful in determining whether to give preference to indoor or outdoor positioning systems, which themselves may conflict when indicating an approaching transition or an actual indoor-outdoor status.

Any one or more of the factors can be used as input to prevent incorrect transitions or facilitate the transition determination process.

In practice, one or more values for a factor are received, and such values are sometimes called "factors" as a matter of convenience.

Such factors can include one or more of the following:
detection of entry into or exit out of a geo-fence;
detection of current position within a bounding polygon associated with a venue;
a current position determined via dead reckoning;
a Wi-Fi signal signature;
activity detection;
device movement speed detection;
indoor-outdoor status determinations shared by another device for a location;
positioning request heuristics;
detection of a low energy beacon;
detection of short-range communications;
step counting;
detected light information from one or more sensors of the mobile computing device;
detected noise patterns from one or more sensors of the mobile computing device;
detected temperature from one or more sensors of the mobile computing device;
analysis results of audio, still images, or video of the mobile device; or the like.

Degraded Global Navigation Satellite System (GNSS) signal can be incorporated with one or more of the other factors. Still other factors can be incorporated as desired.

In any of the examples herein, sensor data indicating a phenomenon detected by the hardware of the mobile device can be received from the hardware of the mobile device, and at least one of the indoor-outdoor-status-determining factors can be calculated from such sensor data and then used in an indoor-outdoor status determination for the mobile device. In practice, a service may do calculations on or provide raw data from the sensors.

Example 9—Example Activation and Deactivation of Factor Collection

In any of the examples herein, indoor-outdoor-status-determining factor collection can be activated or deactivated. Instead of constantly keeping services for collecting such factors active, intelligent activation and deactivation of such services can result in significant power consumption conservation. Thus, sensors for such factors can be dormant, off, sleeping, deactivated, or the like until factors are directed to be collected (e.g., they are needed to make a determination, increase confidence in a status determination, or the like).

As described herein, when collecting such factors, an associated service for collecting the factor can be activated (e.g., before the factor is collected). Subsequently (e.g., after an indoor-outdoor status is confirmed or rejected), the service can be deactivated (e.g., to reduce power consumption).

So, for example, after indoor-outdoor status is confirmed, an indoor or outdoor positioning system can be shut down (e.g., if indoors, the outdoor positioning system can be shut down). In practice, the system can be kept active until a confidence threshold is exceeded. Similarly, the system can be shut down after a delay, in case the device happens to quickly change status (e.g., go back outside). Such a delay can be set according to hardware characteristics, observed desirable values, or the like.

Similarly, responsive to determining that the mobile computing device is approaching an indoor-outdoor transition, a service for collecting one or more additional indoor-outdoor-status-determining factors can be activated (e.g., and the factors collected for incorporation into an indoor-outdoor status determination).

Further, when confidence in the indoor-outdoor status determination is not high, further services can be activated. So, responsive to determining that the indoor-outdoor status exhibits characteristics of a possible false determination (e.g., the confidence score is below a threshold), a service can be activated for collecting one or more further additional indoor-outdoor-status-determining factors. A revised indoor-outdoor status of the mobile device can then be determined via the one or more additional factors. For example, the additional factor(s) can be incorporated into a determination of whether the device is outdoors or indoors.

Example 10—Example Indoor-Outdoor-Status-Determining Factor: Degraded GNSS Signal In any of the examples herein, an indoor-outdoor-status-determining factor can take the form of a Global Navigation Satellite System (GNSS) (e.g., Global Positioning System or the like) failure or degraded signal conditions. Such a condition can lead to an indication of indoor status and preference to indoor positioning engines. Additional or further factors can be consulted to determine when transitions are approaching. Similarly, GNSS failure or degraded signal conditions can be used to confirm or reject a determination made by other factors or services.

An example of when GNSS signal is considered to be degraded is when the number of visible satellites is less than 3.

Such a factor can be based on data collected from a radio receiver of the mobile computing device.

Example 11—Example Indoor-Outdoor-Status-Determining Factor: Geo-fence

In any of the examples herein, an indoor-outdoor-status-determining factor can take the form of detecting entry into or exit out of a geo-fence. Such a factor can include an indication of whether the geo-fence is associated with an indoor or outdoor status. A default indoor-outdoor status can be supported (e.g., geo-fences are assumed to be associated with indoor status unless otherwise noted).

Any of a variety of geo-fence technologies can be used to detect when the mobile computing device enters into or exits out of a geo-fence. An association between a geo-fence and an indicated indoor-outdoor status can be stored. For example, a geo-fence for a bus stop can be associated with an outdoor status, while a geo-fence associated with a shopping mall can be associated with an indoor status.

A geo-fence factor can be used to determine when approaching an indoor-outdoor transition. For example, upon detection of entry into a geo-fence associated with an indoor status, an approaching indoor-outdoor transition can be indicated. The factor can be used to supplement other factors for such a determination.

Similarly, if the geo-fence functionality supports a function for distance from the geo-fence or an indication of when approaching the geo-fence, such functionality can be used to determine when approaching an indoor-outdoor transition. In an implementation where a geo-fence is a point of interest (e.g., latitude, longitude, and radius), a geofence can be placed outside the known coordinates of a venue (e.g., at the boundary of a building). Subsequently, it can be detected that the mobile device is inside the geo-fence, which indicates that a transition is approaching.

Further, a geo-fence factor can be used to confirm or reject a determined status. For example, when a conflict between other factors occurs, or the certainty associated with a determination is below a threshold, the geo-fence factor can be used to confirm or reject an indoor-outdoor status. Detection of entry into a geo-fence associated with an indoor status can confirm an indoors status determination.

Entry into a geo-fence associated with an indoor status and validation against shape boundaries around buildings can be used to proactively prefer indoor positioning engines when at the edges and inside of venues. In addition, such information can be used to proactively display indoor maps.

Example 12—Example Indoor-Outdoor-Status-Determining Factor: Dead Reckoning

In any of the examples herein, an indoor-outdoor-status-determining factor can take the form of a current position determined via dead reckoning. For example, starting with a current position (e.g., determined with high confidence), hardware sensor detection can be used to determine a direction and distance of travel, which is then applied to determine a new current position.

When transitioning inside a venue shape boundary, sensor-based dead reckoning and venue map matching can be activated. When transitioning outside the venue shape boundary, the sensor-based dead reckoning can be deactivated.

Thus, such dead reckoning can be useful in determining when the device is approaching an indoor-outdoor transition, whether or not other positioning systems are unreliable or not available.

A determination of indoor-outdoor status (e.g., based on the position derived via dead reckoning) can be used to confirm or reject a determination made via other factors.

Example 13—Example Indoor-Outdoor-Status-Determining Factor: Signal Signatures In any of the examples herein, an indoor-outdoor-status-determining factor can take the form of a signal signature (e.g., Wi-Fi fingerprint). For example, a detailed signal signature can be collected at the outer edge or outside of a venue to improve transition detection between indoors and outdoors.

For example, the signal signature can be used by the different Wi-Fi positioning techniques described herein to determine whether the device is approaching a transition.

Similarly, such Wi-Fi positioning techniques can be used to make an indoor-outdoor status determination via such signal signatures that is then used to confirm or reject a determination made based on other factors or services.

Such a technique can also be used to prevent false detection. In an implementation that collects Wi-Fi fingerprints inside of a venue, Wi-Fi fingerprints at the outer edge or outside of the venue can be collected as well. Thus, when the device is at the outer edge of the venue, it is correctly determined that the device is outside instead of inside; without such outside fingerprint data, it could easily be determined that the device is inside the venue because of missing outside fingerprint data.

Example 14—Example Indoor-Outdoor-Status-Determining Factor: Activity Detection In any of the examples herein, an indoor-outdoor-status-determining factor can take the form of activity detection. For example, activities such as driving, walking, running, sleeping, working on a desktop, attending a meeting in person, or the like can be provided by a service of the mobile computing device. Such activities can be used to detect transitions or when to expend more resources detecting them (e.g., the user of the device is no longer driving, but is now walking, so a transition is more likely).

Similarly, such activity detection can be used to confirm or reject an indoor-outdoor status determination. For example, if it is known that the user of the device is driving (e.g., at high speed), it is unlikely that the device is indoors. Thus, during progressive collection, the one or more further indoor-outdoor-status-determining factors can comprise an activity detection. If the activity detection indicates a driving activity, it can be incorporated into the indoor-outdoor status determination (e.g., resulting in a conclusive outdoor indoor-outdoor status) to determine that the device is most likely outdoors.

However, a driving activity does not necessarily mean that the device is outside. Driving can take place while inside, such as in a parking structure. The motion and act of driving at high speed can be combined together as described herein to make a more accurate determination.

When collecting additional indoor-outdoor-status-determining factors, activity detection can be included. If the activity detection indicates a driving activity, an indoor-outdoor status of "indoors" can be rejected based on (e.g., responsive to detection of) the indicated driving activity. As described herein, a speed factor can also be incorporated into the determination.

Detection of certain activities can result in preference given to indoor versus outdoor engines (e.g., driving means a high chance of being outside, while walking has a greater chance of transitioning indoors).

In any of the examples herein, activity detection can take the form of activity transitions (e.g., a change from user activity from driving to walking or vice-versa).

Example 15—Example
Indoor-Outdoor-Status-Determining Factor: Device Movement Speed Detection In any of the examples herein, an indoor-outdoor-status-determining factor can take the form of device movement speed detection. For example, the speed of a device (e.g., miles per hour, kilometers per hour, or the like) can be determined via sensors of the mobile device and provided via a service of the mobile device.

When moving at high rates of speed, it is unlikely that the device is indoors. Therefore, the technologies avoid transitioning to indoor positioning under such a condition. For example, if an activity of driving is indicated, and the speed is over a threshold (e.g., 30 miles per hour or some other threshold), it is most likely that the device is outdoors. An activity of driving at lower speeds may indicate that the device has moved indoors (e.g., in a parking structure). Additional or other factors, (e.g., GNSS signal fails, tending to indicate indoors status) can be combined into the determination to confirm or reject the indoor-outdoor status determination. Thus, speed of movement can help prevent an incorrect transition or facilitate the determination.

Another use for device movement speed is to determine when the device is approaching a bounding box (e.g., based on the estimated speed) and then engage additional sensing to improve the indoor-outdoor status determination.

Example 16—Example
Indoor-Outdoor-Status-Determining Factor: Indoor-Outdoor Status Determinations Shared by Other Devices In any of the examples herein, an indoor-outdoor-status-determining factor can take the form of indoor-outdoor status determinations shared by another device for a location. For example, when a device makes a determination of whether a particular device is indoors or outdoors, it can share an indication of the location and the determination that was made. In practice, a database of many locations as determined by many devices can be shared among devices. Such information can be verified or audited to avoid faulty determinations.

Example 17—Example
Indoor-Outdoor-Status-Determining Factor: Positioning Request Heuristics In any of the examples herein, an indoor-outdoor-status-determining factor can take the form of a positioning request heuristics. For example, the type of application requesting the location, whether the application is requesting a single position or continuous stream, and whether the application wants very high accuracy or not can be used to determine when to give preference to indoor or outdoor engines when detecting an approaching transition or when making the actual indoor-outdoor status determination itself.

Such a factor can be used to assist when determining when to resolve conflict between positioning systems (e.g., to give preference to an outdoor system or an indoor system).

Example 18—Example
Indoor-Outdoor-Status-Determining Factor: Low Energy Beacons

In any of the examples herein, an indoor-outdoor-status-determining factor can take the form of detection of a low energy beacon. For example, Bluetooth low energy beacons or other low-power, short-range radio beacons can be detected. Such beacons can be associated with a position, indoor-outdoor status, or both.

Accordingly, when such beacons are detected, an approaching indoor-outdoor transition can be indicated.

Further, collection of the low energy beacon factor can be useful to confirm or reject a determination made in conjunction with other services.

Detection of a low energy beacon can be used as a signal to give preference to indoor engines.

Example 19—Example
Indoor-Outdoor-Status-Determining Factor: Step Counting

In any of the examples herein, an indoor-outdoor-status-determining factor can take the form of step counting. Step counting in combination with previous indoor-outdoor transition history can improve reliability and speed of subsequent transitions.

Step counting can be incorporated into dead reckoning, but can also be useful independently of dead reckoning. For example, after a conclusive indoor-outdoor status determination is made, a re-determination can be inhibited until the device has moved a threshold number of steps. Not activating services for making a re-determination can conserve power.

Similarly, if only a few steps are taken and the device goes out-of-range with short-range sensors, a transition to outdoors can be determined. A transition to indoors can also be similarly detected (e.g., a few steps and the device goes in-range with short-range sensors).

Example 20—Example
Indoor-Outdoor-Status-Determining Factor: Light, Noise Patterns, or Temperature Sensors In any of the examples herein, an indoor-outdoor-status-determining factor can take the form of detected light information from one or more sensors of the mobile computing device, detected noise patterns from one or more sensors of the mobile computing device, detected temperature from one or more sensors of the mobile computing device, or combinations thereof.

For example, significant changes (e.g., the difference in collected readings over time is over a threshold) in light, noise patterns, or temperature can indicate a possible indoor-outdoor transition.

Such a factor can be combined with other factors. However, a significant change can result in activation of other services to make an indoor-outdoor status determination on a brief basis and then shutting down if the factor was a false indicator.

Example 21—Example
Indoor-Outdoor-Status-Determining Factor: Audio,
Still Images, or Video In any of the examples herein, an indoor-outdoor-status-determining factor can take the form of analysis results of audio, still images, or video collected by hardware of a mobile device for which an indoor-outdoor status determination is being made.

Example 22—Example
Indoor-Outdoor-Status-Determining Factor:
Detection of Position Within Bounding Polygon In any of the examples herein, an indoor-outdoor-status-determining factor can take the form of detection of current position within a bounding polygon. Such a bounding polygon can be associated with a venue and represent a real-world location (e.g., a building or the like). Although bounding polygons can be used for a venue defined as being outdoors, a default of indoor status can be used for bounding polygons. Thus, when the current position of the device is determined to be within a bounding polygon (e.g., the position is within the perimeter of the polygon), a status can be set to indoor. The bounding polygon can take the form of a shape boundary around a building.

However, as described herein, the polygon perimeter can be intentionally set, or detection modified, so that it is slightly inside or outside the physical perimeter of a building (e.g., the boundaries incorporate a venue buffer zone around a physical boundary of the venue). Thus, the bounding polygon can be used to detect an approaching indoor-outdoor transition as described herein. So, detecting that the mobile computing device is approaching an indoor-outdoor transition can comprise determining that the mobile computing device has entered (or exited) a bounding polygon associated with a venue (e.g., associated with an indoor or outdoor status).

Such a technique can be used when entering the venue or exiting the venue. A transition can be detected by determining that the mobile computing device has entered a venue buffer zone associated with a venue (e.g., whether the buffer zone is inside the venue, outside of the venue, or both). For exiting scenarios, the polygon perimeter can be set to be slightly smaller than the physical boundary, thus incorporating the buffer zone.

A bounding polygon can be indicated via a plurality of points in two-dimensional space. Thus, bounding polygon perimeters can be so represented.

A bounding polygon can take the form of a bounding box (e.g., having four corners). Although sometimes less precise, a bounding box can be checked quickly. So, a bounding box can be used for a quick, course check, and if inside of it, a bounding polygon check can be used to confirm that the current position is within the bounding polygon.

A geo-fence technique can be used to define or otherwise indicate a boundary around a building or venue.

Example 23—Example Bounding Polygon for
Indoor-Outdoor Transition

Figure 3:
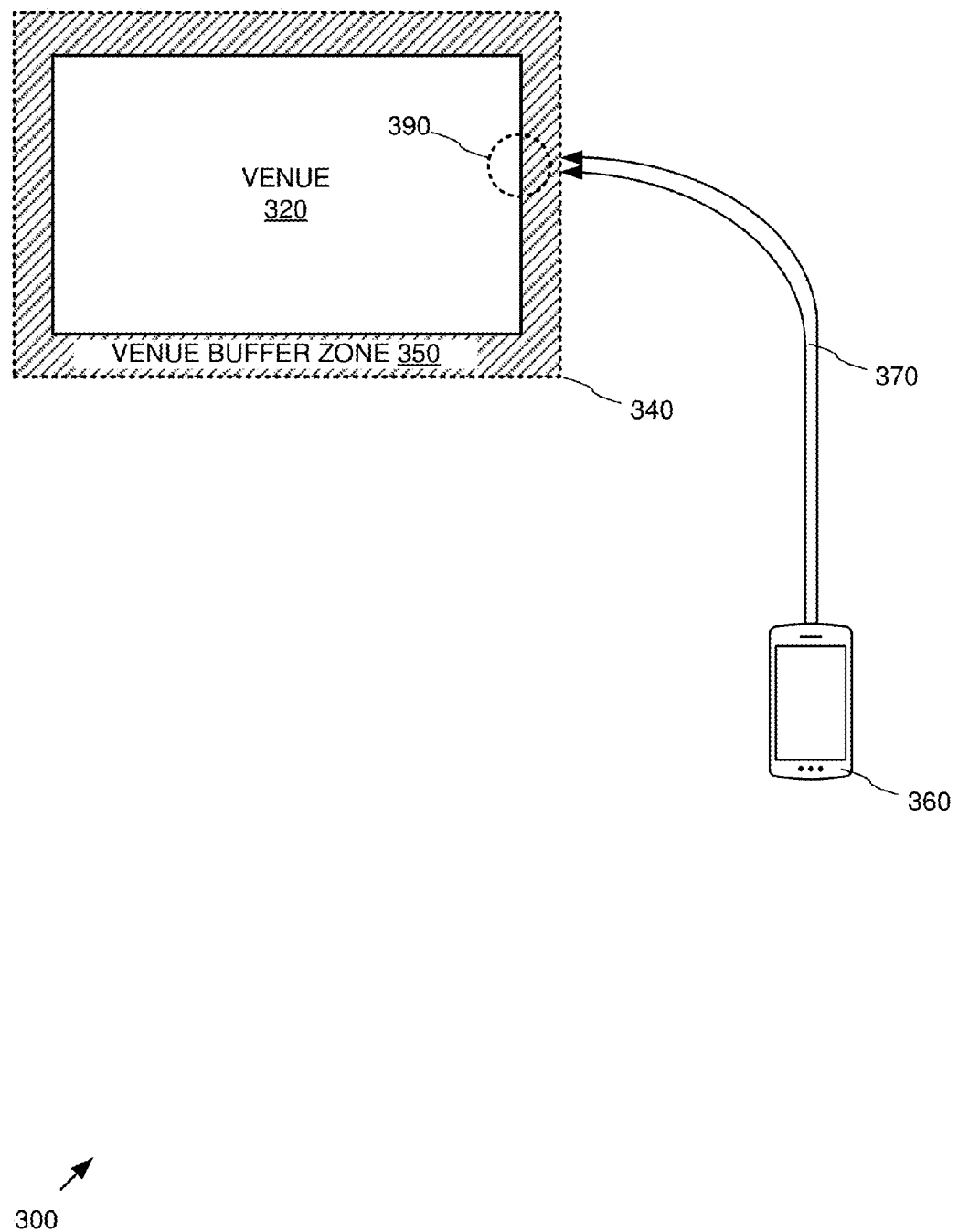
FIG. 3 is a map showing an example bounding polygon for a venue being approached by a mobile device in an indoor-outdoor transition.

FIG. 3 is a map 300 showing an example bounding polygon 340 for a venue 320 being approached by a mobile computing device 360 in an indoor-outdoor transition that can be used in any of the examples herein. In the example, a mobile computing device 360 is moving along a path 370 toward an indoor venue 320. A stored representation of a bounding polygon 340 can be used to determine whether the device 360 is approaching an indoor-outdoor transition (e.g., going into the venue 320). A venue buffer zone 350 (e.g., transition zone) around the venue 320 can be used to provide sufficient time to detect and account for the determination. Thus, the polygon is drawn as slightly outside the physical boundary of the venue 320.

For purposes of discussion, an ideal transition point 390 (e.g., door into the venue) can be considered and used to engineer the polygon 340 and various of the other factors described herein.

Although the example shows entry to an indoor venue, the technologies can support exiting the venue in a similar way (e.g., a venue buffer zone slightly inside the venue).

Example 24—Example Positioning Systems

In any of the examples herein, one or more indoor positioning systems and one or more outdoor positioning systems can be used by the technologies to detect an approaching indoor-outdoor transition, make an indoor-outdoor status determination, or both.

In the case of Wi-Fi positioning, an indoor technique using signal strength (e.g., signal signatures or fingerprints) of access points (e.g., which can be combined with time of flight to the access points), an outdoor technique using mere presence of the access point, or the like can be used.

Outdoor Wi-Fi positioning can benefit from crowdsourcing the positioning data because GNSS (e.g., GPS) data is typically also available. However, manual collection of data for indoor locations (e.g., where GNSS signal is poor or unavailable) can be used to supplement the traditionally outdoor-based Wi-Fi location service to work indoors. A service provide can provide such data for use by devices, resulting in usable results for the outdoor Wi-Fi positioning when at or near indoor-outdoor transitions.

Cell-based positioning system can also be used in any of the examples described herein.

As described herein, two location services can work in conjunction to provide an overall better determination of indoor-outdoor status for the device.

Beacons can be used for both indoor and outdoor systems, even if the systems are different. The systems can intelligently account for beacons in an appropriate way and thus work in conjunction to make better determinations than a single system working alone.

Beacons from the indoor Wi-Fi location service can be published to the outdoor Wi-Fi location service.

In any of the examples herein, based on determined indoor-outdoor status, a choice can be made between an indoor positioning system and an outdoor positioning system. The position of the mobile device can then be determined via the chosen positioning system.

Similarly, in any of the examples herein, one or more of the positioning systems can be employed to determine a current position for purposes of determining whether the device is within a bounding polygon (e.g., to detect an approaching indoor-outdoor transition).

Example 25—Example System Implementing
Bounding Polygon

Figure 4:
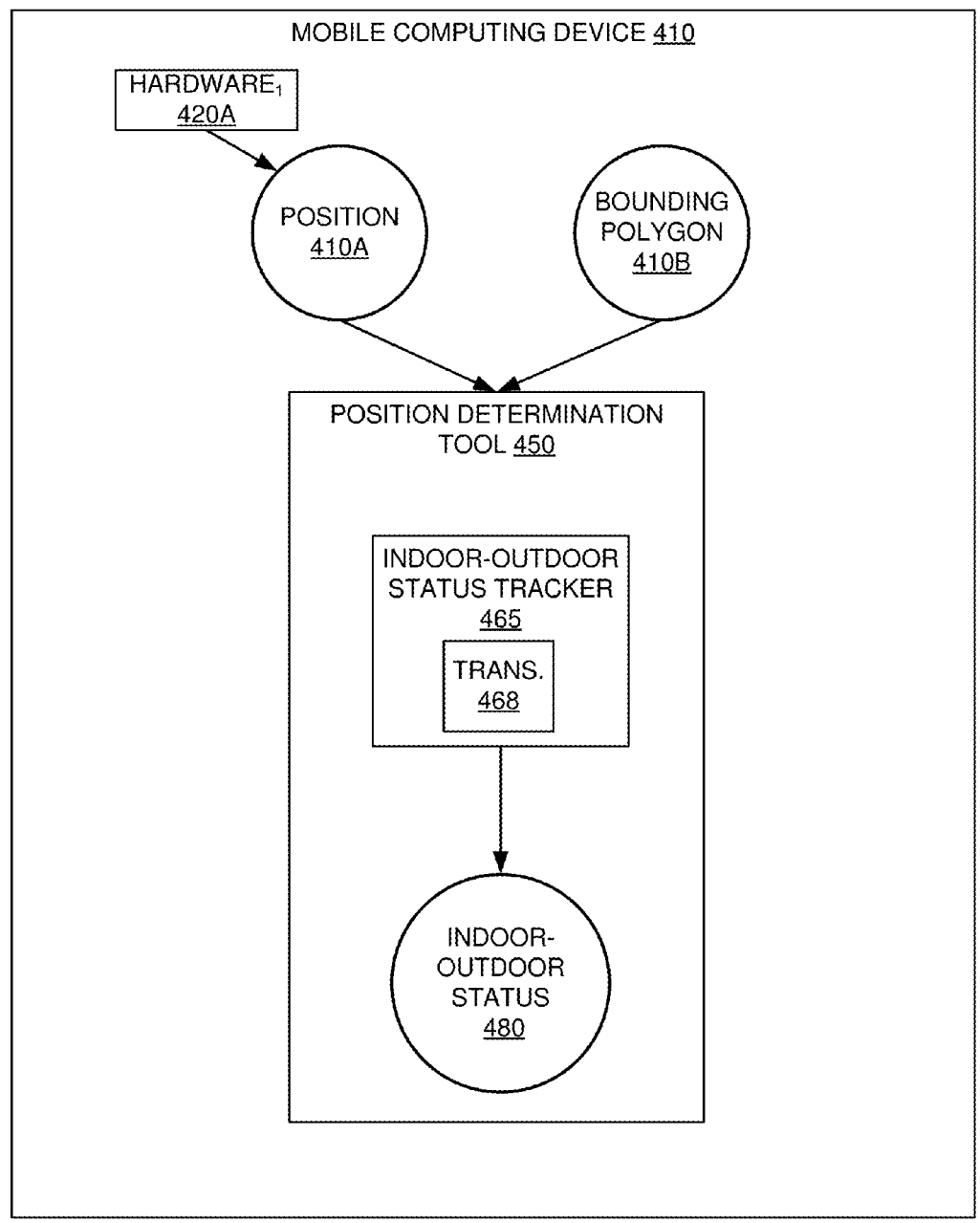
FIG. 4 is a block diagram of an example system implementing a bounding polygon to detect an approaching indoor-outdoor transition.

FIG. 4 is an example system 400 implementing a bounding polygon to detect an approaching indoor-outdoor transition in a scenario such as that shown in FIG. 3. In the example, a current position 410A derived from hardware sensor 420A and a bounding polygon 410B are used as input to an indoor-outdoor status tracker 465 of a positioning determination tool 450.

The indoor-outdoor transition indicator 468 can be set according to whether the position 410A is within the bounding polygon 410B. In the case of a bounding box, the polygon 410B can be represented by four points. Other shapes can be similarly represented. The polygon 410B can be any of the bounding polygons or bounding boxes described herein and can be drawn to include a venue buffer zone.

Information representing the bounding polygon 410B can be drawn from map data to leverage map delivery systems. However, such data can be maintained or provided separately from such map data as desired.

In practice, a plurality of bounding polygons can be stored, and a determination can be made if the current position is within any of them.

Example 26—Example Method Implementing Bounding Polygon

Figure 5:
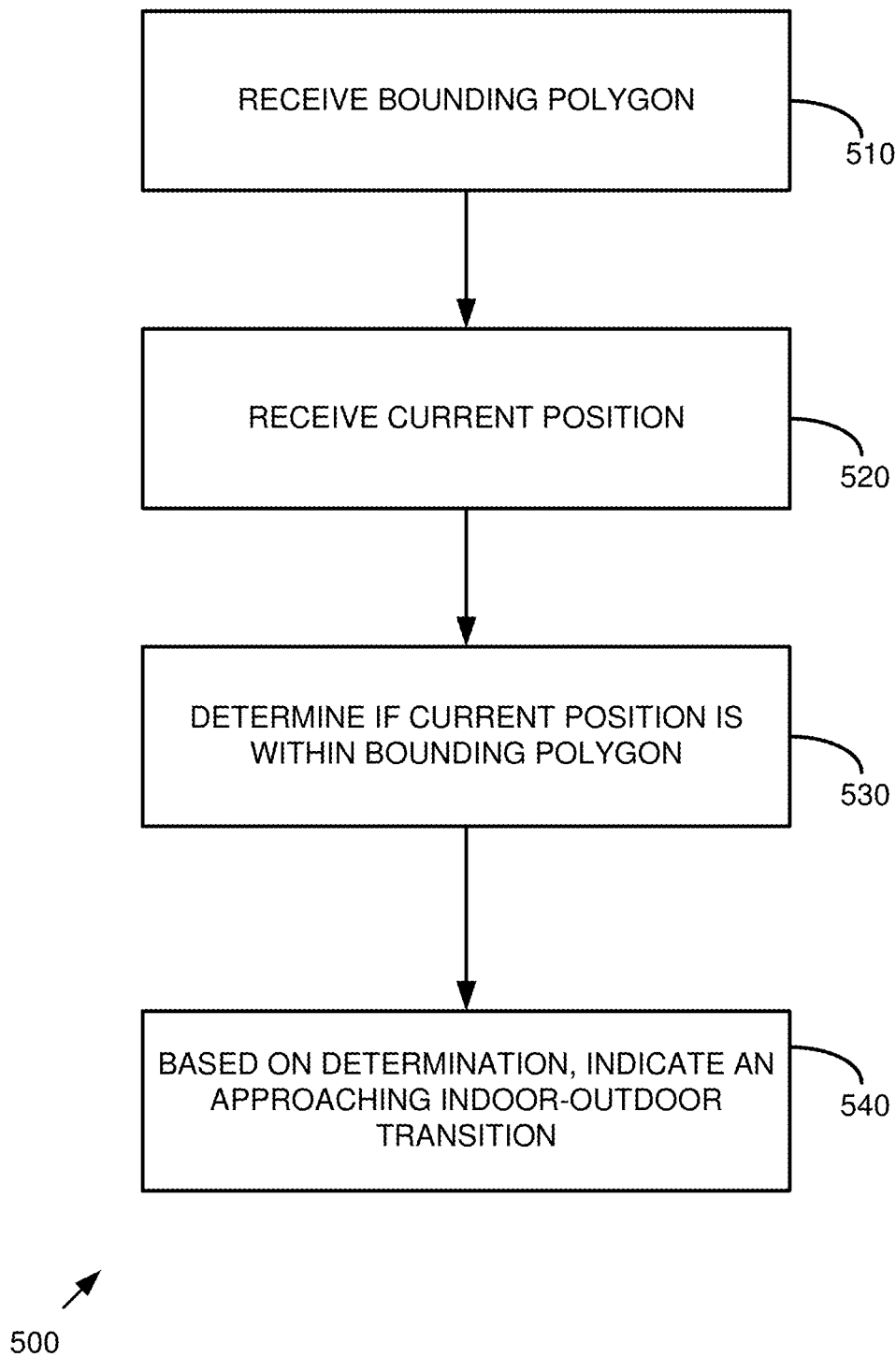
FIG. 5 is a flowchart of an example method implementing a bounding polygon to detect an approaching indoor-outdoor transition.

FIG. 5 is a flowchart of an example method 500 implementing a bounding polygon to detect an approaching indoor-outdoor transition and can be implemented, for example, in the system shown in FIG. 4.

At 510 a representation of a bounding polygon (e.g., associated with a venue having a venue status) is received. The polygon can be any of the bounding polygons or bounding boxes described herein and can be drawn to include a venue buffer zone.

A bounding polygon can comprise a series of latitude/longitude pairs for respective vertices of the polygon. They can be stored in an online service and downloaded on demand, stored locally, or both. Although a variety of implementations are possible, such bounding polygons can be created by the venue map creator and stored as metadata with the venue map.

A bounding box can be presented by 2 points (e.g., lower left and upper right pair of positions) to form a rectangle.

A system can support a large number of venues, so downloading can be limited to only the ones that are likely to be entered. Heuristics for determining likely venues can include one or more of the following:

1. Based on the current position, the bounding polygons for the closest venues are downloaded
2. The set of downloaded venues can be extended when less expensive resources are available (e.g., when charging, when not using battery, when on Wi-Fi instead of cellular data, or the like).
3. Popular venues can be downloaded (e.g., ahead of others) based on criteria maintained by the online service, even if the other criteria are not met
4. Venues that are likely to be of interest to a user of the device (e.g., based on observed behavior, online searches, or the like) can be downloaded.

At 520, a current position of the mobile computing device is received. As described herein, any of the indoor or outdoor positioning systems or other techniques described herein can be used to determine such a position.

At 530, it is determined whether the current position is within the bounding polygon. "Within" the bounding polygon can be determined in a variety of ways. For example, when overlap between the polygon and position error circle is greater than a threshold (e.g., 100% indicates certainly inside), the device is determined to be within the polygon. Or, a determination can be made when the center of the position error circle is inside the polygon and the error circle is smaller than a threshold (e.g., relative to the polygon size). Similarly, if the position error circle is completely outside of the polygon, then a determination of certainly not within the bounding polygon can be made.

At 540, based on the determination, it can be indicated that the device is approaching an indoor-outdoor transition. Such an indication can be provided responsive to such a determination. For example, an ongoing check can be made to see if the device is within a bounding box. Responsive to detection that the device has entered the bounding box, an indication that the device is approaching an indoor-outdoor transition can be provided (e.g., it is detected that the device is approaching a transition). Such an indication can be used to trigger collection of additional factors as described herein.

Example 27—Example Status Determination Via Different Wi-Fi Positioning Systems

Figure 6:
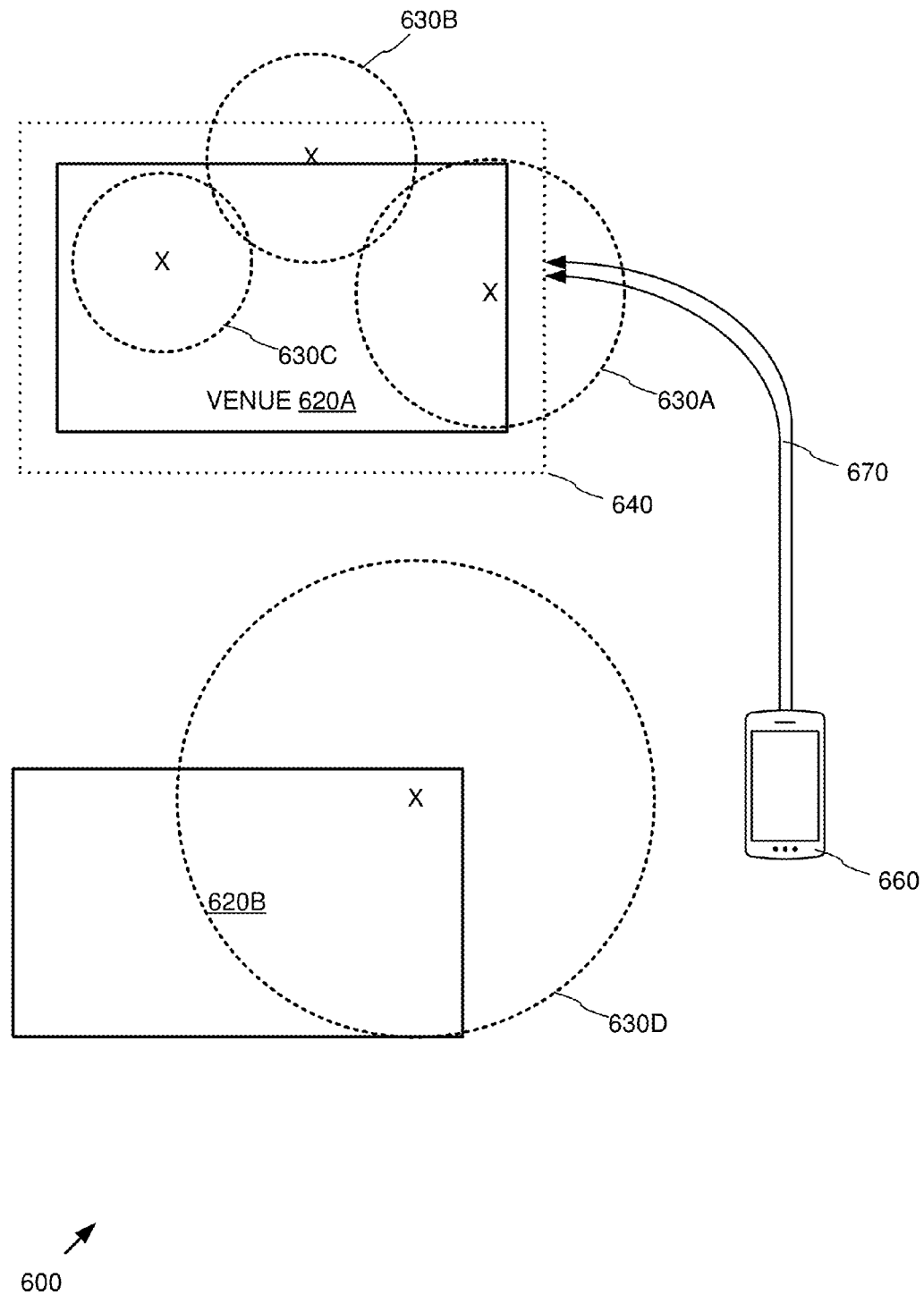
FIG. 6 is a map showing example Wi-Fi signals that can be relied upon for indoor-outdoor status determination during an indoor-outdoor transition.

FIG. 6 is a map 600 showing example Wi-Fi signals 630A-D that can be relied upon for indoor-outdoor status determination during an indoor-outdoor transition using different Wi-Fi positioning techniques that can be employed in any of the examples herein.

In the example, Wi-Fi signals 630A-D from venues 620A-B can be relied upon by different Wi-Fi positioning techniques. For example, a typically outdoor-based (e.g., centroid) Wi-Fi positioning technique can be used to collect detected Wi-Fi access points that are then used to make a positioning determination. Such a positioning determination can be used in conjunction with other techniques herein (e.g., the bounding box 640, the signal signature (e.g., fingerprint) technologies, or the like) as the mobile device 660 travels along the path 670.

As the mobile device 660 approaches the venue 620A, an indoor Wi-Fi positioning service (e.g., relying on signal strength or signal signatures) can be activated and consulted to confirm whether the device 660 is indeed inside or outside (e.g., of the venue 620A). In practice, false positives are possible, so the two techniques can be consulted. Various techniques of combining the determinations (e.g., voting, with unanimous voting for inside indicating an inside status) can be used, and other indoor-outdoor-status-determining factors can be incorporated to confirm or reject such a status determination (e.g., a driving activity status indicating that the device has an outdoor status).

Figure 7:
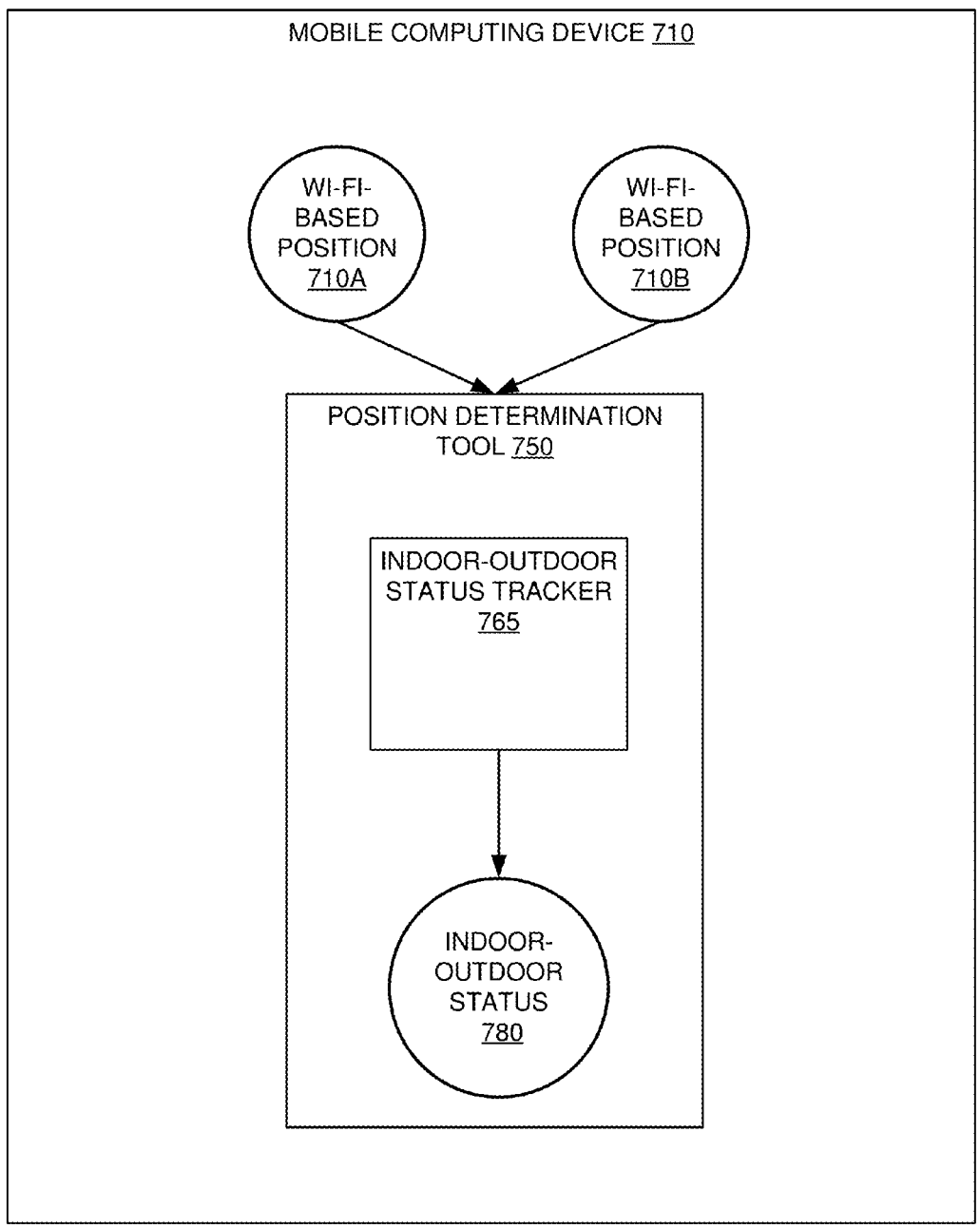
FIG. 7 is a block diagram of a system determining indoor-outdoor status during an indoor-outdoor transition via Wi-Fi signals processed by different Wi-Fi positioning systems.

Example 28—Example System Determining Status Via Wi-Fi Signals Processed by Different Wi-Fi Positioning Systems FIG. 7 is a block diagram of a system determining indoor-outdoor status during an indoor-outdoor transition via Wi-Fi signals processed by different Wi-Fi positioning systems that can be used in a scenario such as that shown in FIG. 6.

In the example, the indoor-outdoor status tracker 765 operates as part of a position determination tool 750 and accepts the Wi-Fi-based position 710A as determined by a first Wi-Fi positioning system and the Wi-Fi-based position 710B as determined by a second, different Wi-Fi positioning system as input to determine an indoor-outdoor status 780. In practice, the same signals from Wi-Fi access points can be processed by two different positioning systems to arrive at independent determinations of whether the device is indoors or outdoors.

Alternatively, the positions 710A-B can be implemented as indoor-outdoor-status-determining factors, an indication of the indoor-outdoor status of the device 710 (e.g., as determined by the different respective systems), or the like.

Example 29—Example Method Implementing Different Positioning Systems

Figure 8:
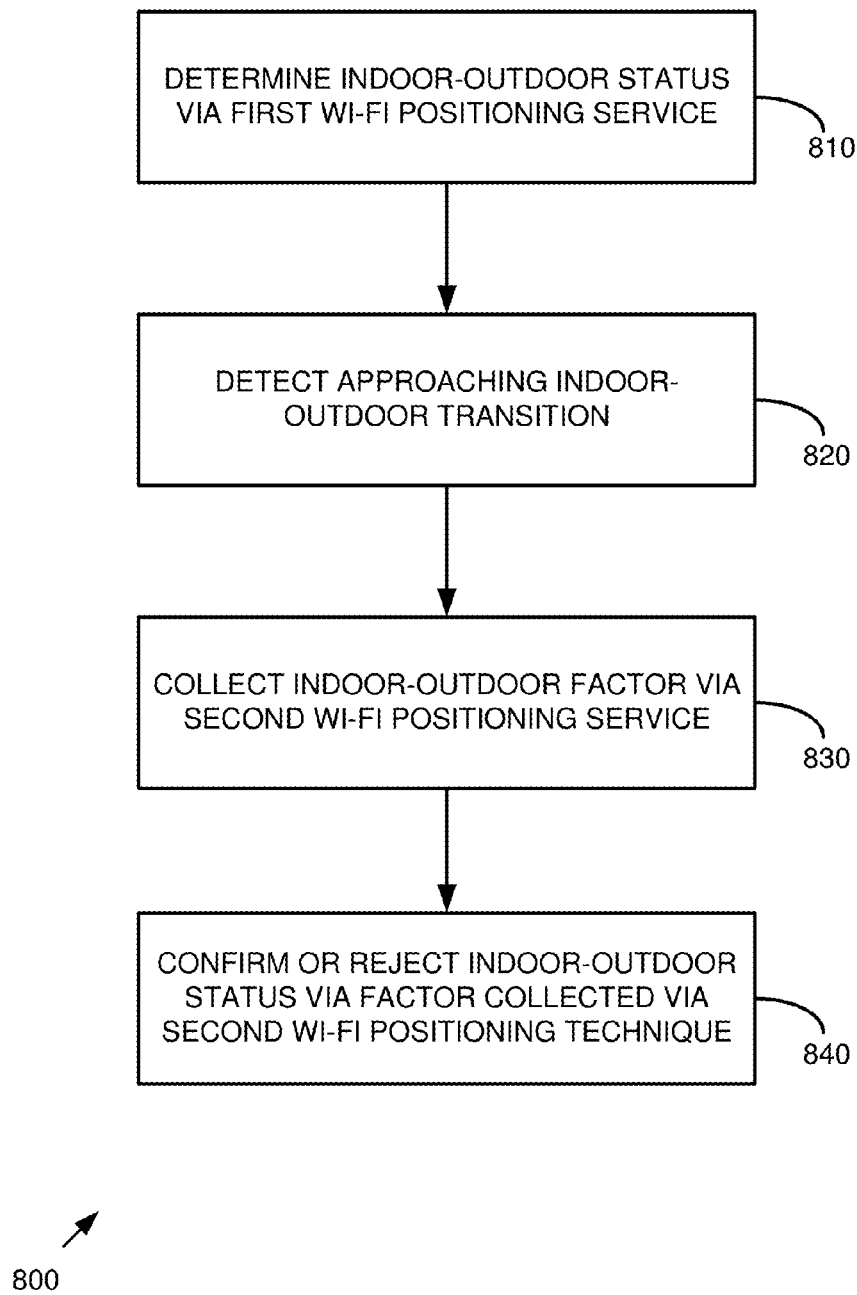
FIG. 8 is a flowchart of an example method of determining indoor-outdoor status during an indoor-outdoor transition via Wi-Fi signals processed by different Wi-Fi positioning systems.

FIG. 8 is a flowchart of an example method 800 of determining indoor-outdoor status during an indoor-outdoor transition via Wi-Fi signals processed by different Wi-Fi positioning systems and can be implemented, for example, in the system shown in FIG. 7.

At 810, an indoor-outdoor status is determined via a first Wi-Fi positioning technique. As described herein, any number of indoor-outdoor-status-determining factors can be used.

At 820, it is detected that the mobile computing device is approaching an indoor-outdoor transition. As described herein, any number of indoor-outdoor-status-determining factors can be used.

At 830, an indoor-outdoor-status-determining factor is collected via a second Wi-Fi positioning technique. Other factors can be progressively added as described herein. Services for collecting such factors can be activated responsive to detection of the approaching transition, responsive to indication that a confirmation/rejection is requested, or the like. A factor can take the form of an indoor-outdoor status as determined by the technique or service.

At 840, the indoor-outdoor status is confirmed or rejected via the factor collected via the second Wi-Fi positioning technique. One or more progressively collected indoor-outdoor-status-determining factors can also be included in the confirmation or rejection process.

Although some examples show different Wi-Fi-positioning systems, any different (e.g., outdoor and indoor) positioning systems can be used. An indoor positioning system can use Bluetooth and the like instead or in addition to Wi-Fi technologies.

As described herein, unused services can then be deactivated to reduce power consumption.

Such a technique can be incorporated into the method shown in FIG. 2. For example, at least one of the one or more initial indoor-outdoor-status-determining factors can be collected via an outdoor Wi-Fi positioning system and at least one of the one or more additional indoor-outdoor-status-determining factors can be collected via an indoor Wi-Fi positioning system. Confirming or rejecting the indoor-outdoor status can include resolving a conflict between the two Wi-Fi positioning systems (e.g., by indicating outdoors unless both systems concur on an indoors status as described herein).

Figure 9:
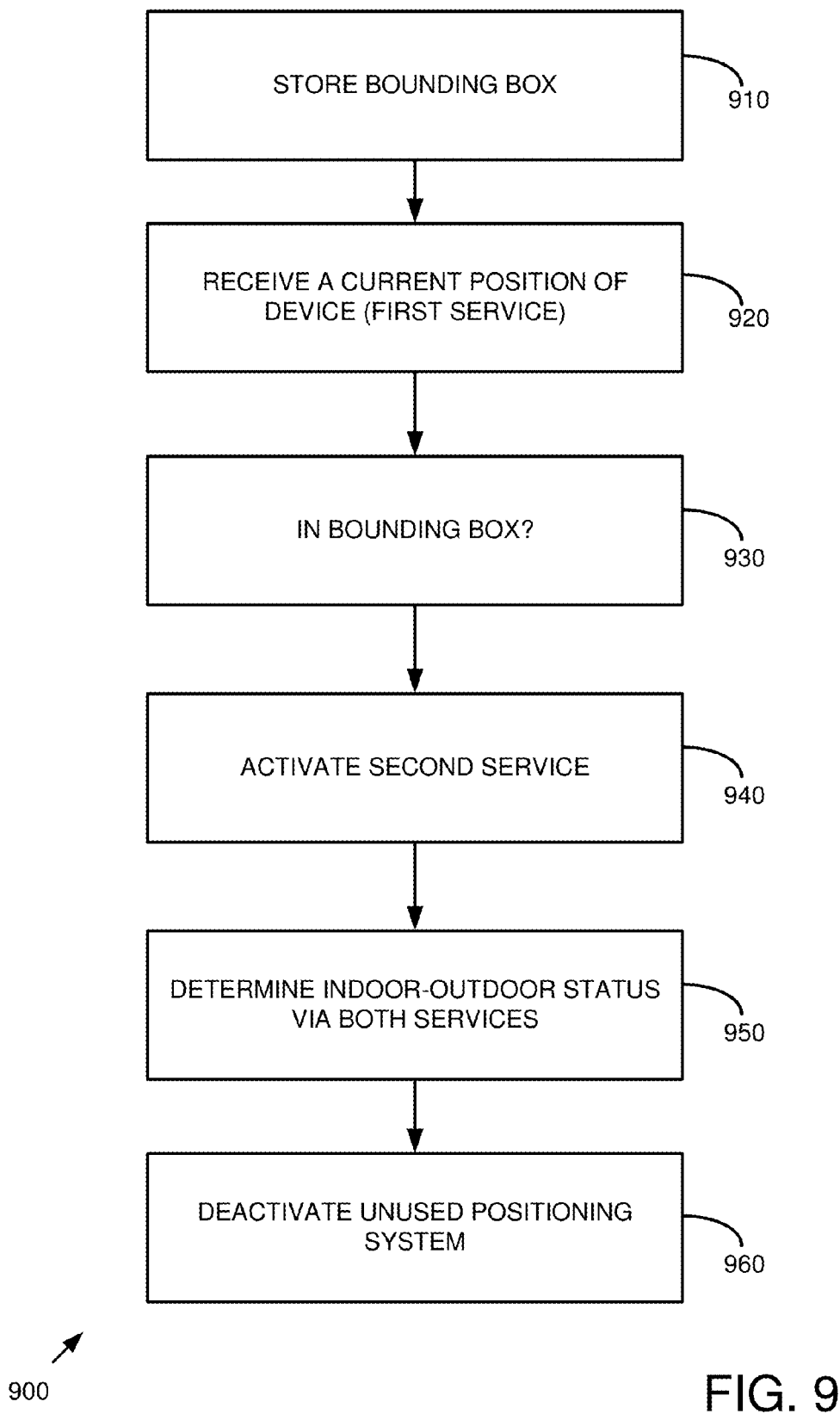
FIG. 9 is a flowchart of an example method of determining indoor-outdoor status that combines bounding boxes with usage of different Wi-Fi positioning systems.

Example 30—Example Method Implementing Bounding Boxes and Different Wi-Fi Positioning Systems FIG. 9 is a flowchart of an example method 900 of determining indoor-outdoor status during an indoor-outdoor transition via Wi-Fi signals processed by different Wi-Fi positioning systems with use of a bounding box and can be implemented, for example, in any of the systems described herein.

At 910, a bounding box is stored. As described herein, such a bounding box can be constructed to be slightly inside or outside the physical boundary of a building.

At 920, a current position of the mobile computing device is received. Such a position can be derived from or received from a first positioning service (e.g., an outdoor positioning service based on GNSS or the like).

At 930, it is determined whether the current position is within the bounding box.

At 940, responsive to determining that the current position is within the bounding box, a second positioning service is activated. Being within the bounding box indicates that mobile computing device is approaching an indoor-outdoor transition.

At 950, an indoor-outdoor status is determined via both services (e.g., via service-provided positions, indoor-outdoor statuses, or the like). For example, if both systems indicate that the device is indoors, an indoor indoor-outdoor status is determined. Otherwise (e.g., in the case of a conflict), an outdoor status is determined. The determination can be supplemented by additional indoor-outdoor-status-determining factors (e.g., activity detection or the like).

At 960, after a determination of indoor-outdoor status is made (e.g., that the device is indoors), an unused positioning system (e.g., outdoor positioning system) is deactivated. As described herein, power consumption can thereby be conserved.

Example 31—Example User Configuration

A number of user settings can be provided for the technologies. For example, a user can change Bluetooth connectivity configuration. Wi-Fi connectivity can also be configured. For example, a user can configure a Wi-Fi setting so that when the device is connected to a specific access point, it is determined to be indoors. A work access point can also be used to determine indoors status. Such a determination can also be based on automatically detected access points, rather than depending on user input.

Further, user-initiated activity by an application, such as zooming to a venue in a map can be used as a factor to prefer indoor positioning.

A user can also set a time-based configuration (e.g., based on the current time being during office hours, the device is determined to be indoors).

Example 32—Example Non-Positioning Implementations

Although examples herein describe determining an indoor-status for the purpose of positioning, the technologies can be equally applied to other scenarios. For example, search results can be tailored based on indoor-outdoor status (e.g., to limit or prioritize results based on the status). Further, search results can be tailored based on presence within a particular venue (e.g., to limit or prioritize results based on the venue).

Targeted advertising, special events, or services available in a venue can be provided based in indoor-outdoor status or detection as being within a venue.

When approaching indoors, based on the type of venue (e.g., public), parking information can be provided automatically to help find parking spots.

An indoor determination can also be used to reinforce other determinations (e.g., to unlock enterprise apps when inside of a particular office).

User settings can be dynamically changed based on determined indoor-outdoor status (e.g., audio to vibrate when inside, loudness increased when outdoors, or the like).

A determination of being indoors can also automatically activate services (e.g., Bluetooth beacons) associated with the indoors.

Example 33—Example Advantages

As described herein, the technologies can provide a more accurate determination of whether a device is indoors or outdoors. Accordingly, a more positive user experience can result. For example, an error in indoor-outdoor status can result in faulty positioning, leading to nonsensical or confusing scenarios by a device (e.g., telling a user to continue walking straight when a wall is in the way). Such errors can therefore be avoided.

As described herein, the technologies can help manage activation and deactivation of services, including the positioning determining systems themselves. As a result, electrical power consumption can be reduced, leading to longer useful life of batteries of the mobile computing device. A proper balance between using such services to make an accurate positioning determination and conserving power consumption can be reached.

The technologies can also result in a faster determination of whether the device is indoors or outdoors. As a result, a more positive user experience can again be provided. Because the results are more accurate and happen faster, they appear closer to real time instead of being delayed or lagging.

As described herein, the technologies can also reduce the zone in which indoor-outdoor status is uncertain or incorrect. As a result, in addition to providing a positive user experience, services for the additional or further factors can be deactivated sooner, again resulting in power conservation.

Still further advantages include more accurately tagging pictures, sharing an indoor location, providing better suggestions in a venue, calculating how much time a device (e.g., and thus the associated user) spends indoors versus outdoors, recording and indicating how long a device (e.g., and thus the user) spent at a given indoor place, or the like.

Further, when making an indoor to outdoor transition, prompt suggestions regarding weather, traffic, and transit options can be better provided (e.g., information to support such suggestions can be downloaded before they are requested or automatically provided).

Search results can be better tailored based on accurate status of the user (e.g., whether indoors or outdoors as well as the venue into which the device has traveled).

Example 34—Example Computing Systems

Figure 10:
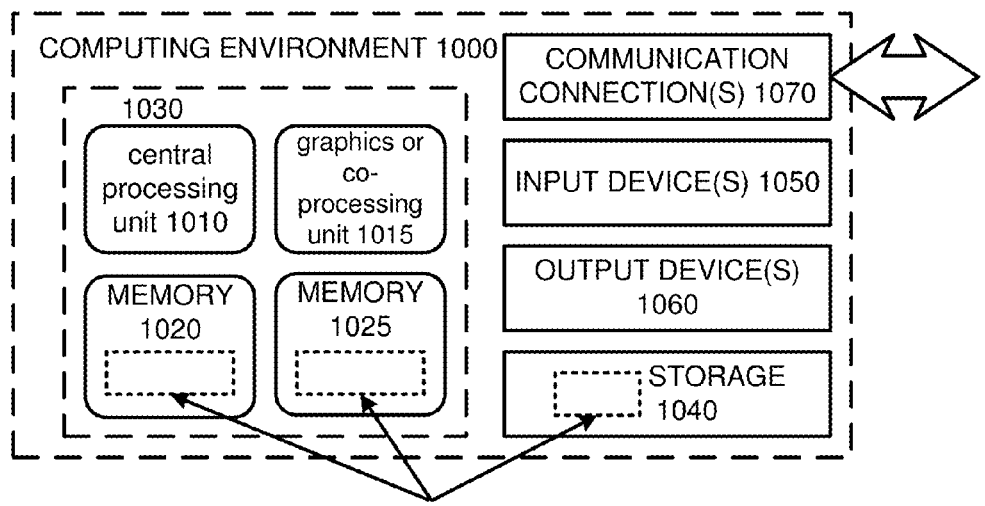
FIG. 10 is a diagram of an example computing system in which some described embodiments can be implemented.

FIG. 10 illustrates a generalized example of a suitable computing system or environment 1000 in which several of the described innovations may be implemented. The computing system 1000 is not intended to suggest any limitation as to scope of use or functionality, as the innovations may be implemented in diverse general-purpose or special-purpose computing systems. A mobile device as described herein can take the form of the described computing system 1000.

With reference to FIG. 10, the computing system 1000 includes one or more processing units 1010, 1015 and memory 1020, 1025. In FIG. 10, this basic configuration 1030 is included within a dashed line. The processing units 1010, 1015 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 10 shows a central processing unit 1010 as well as a graphics processing unit or co-processing unit 1015. The tangible memory 1020, 1025 may be volatile memory (e.g., registers, cache, RAM), non-volatile memory (e.g., ROM, EEPROM, flash memory, etc.), or some combination of the two, accessible by the processing unit(s). The memory 1020, 1025 can store software 1080 implementing one or more innovations described herein, in the form of computer-executable instructions suitable for execution by the processing unit(s).

A computing system may have additional features. For example, the computing system 1000 includes storage 1040, one or more input devices 1050, one or more output devices 1060, and one or more communication connections 1070. An interconnection mechanism (not shown) such as a bus, controller, or network interconnects the components of the computing system 1000. Typically, operating system software (not shown) provides an operating environment for other software executing in the computing system 1000, and coordinates activities of the components of the computing system 1000.

The tangible storage 1040 may be removable or non-removable, and includes magnetic disks, magnetic tapes or cassettes, CD-ROMs, DVDs, or any other medium which can be used to store information in a non-transitory way and which can be accessed within the computing system 1000. The storage 1040 can store instructions for the software 1080 implementing one or more innovations described herein.

The input device(s) 1050 may be a touch input device such as a keyboard, mouse, pen, or trackball, a voice input device, a scanning device, or another device that provides input to the computing system 1000. For video encoding, the input device(s) 1050 may be a camera, video card, TV tuner card, or similar device that accepts video input in analog or digital form, or a CD-ROM or CD-RW that reads video samples into the computing system 1000. The output device(s) 1060 may be a display, printer, speaker, CD-writer, or another device that provides output from the computing system 1000.

The communication connection(s) 1070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-readable media. Computer-readable media are any available tangible media that can be accessed within a computing environment. By way of example, and not limitation, with the computing system 1000, computer-readable media include memory 1020, 1025, storage 1040, and combinations of any of the above.

The innovations can be described in the general context of computer-executable instructions, such as those included in program modules, being executed in a computing system on a target real or virtual processor (e.g., which is ultimately executed in hardware). Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level descriptions for operations performed by a computer, and should not be confused with acts performed by a human being. The actual computer operations corresponding to these terms vary depending on implementation.

Example 35—Example Mobile Device

Figure 11:
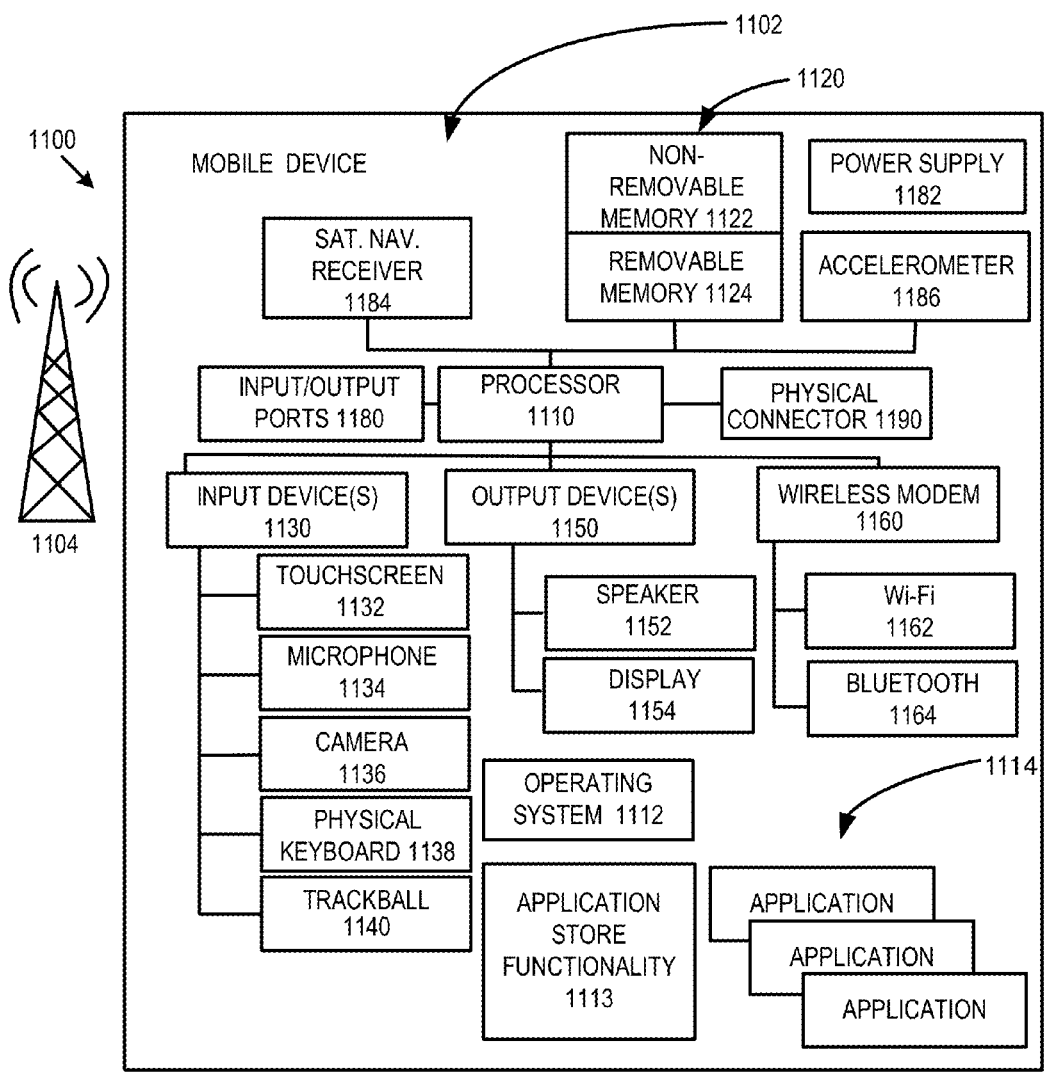
FIG. 11 is an example mobile device that can be used for the technologies described herein.

In any of the examples herein, a device can take the form of a mobile device. FIG. 11 is a system diagram depicting an example mobile device 1100 including a variety of optional hardware and software components, shown generally at 1102. Any components 1102 in the mobile device can communicate with any other component, although not all connections are shown, for ease of illustration. The mobile device can be any of a variety of mobile computing devices (e.g., cell phone, smartphone, tablet, handheld computer, drone, Personal Digital Assistant (PDA), etc.) and can allow wireless two-way communications with one or more mobile communications networks 1104, such as a cellular, satellite, or other network. Voice over IP scenarios (e.g., over Wi-Fi or other network) can also be supported. The communication devices described herein can take the form of the described mobile device 1100.

The illustrated mobile device 1100 can include a controller or processor 1110 (e.g., signal processor, microprocessor, ASIC, or other control and processing logic circuitry) for performing such tasks as signal coding, data processing, input/output processing, power control, and/or other functions. An operating system 1112 can control the allocation and usage of the components 1102 and support for one or more application programs 1114. The application programs 1114 can include common mobile computing applications (e.g., email applications, calendars, contact managers, web browsers, messaging applications), or any other computing application. Functionality 1113 for accessing an application store can also be used for acquiring and updating applications 1114.

The illustrated mobile device 1100 can include memory 1120. Memory 1120 can include non-removable memory 1122 and/or removable memory 1124. The non-removable memory 1122 can include RAM, ROM, flash memory, a hard disk, or other well-known memory storage technologies. The removable memory 1124 can include flash memory or a Subscriber Identity Module (SIM) card, which is well known in GSM communication systems, or other well-known memory storage technologies, such as "smart cards." The memory 1120 can be used for storing data and/or code for running the operating system 1112 and the applications 1114. Example data can include web pages, text, images, sound files, video data, or other data sets to be sent to and/or received from one or more network servers or other devices via one or more wired or wireless networks. The memory 1120 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 1100 can support one or more input devices 1130, such as a touch screen 1132, microphone 1134, camera 1136, physical keyboard 1138 and/or trackball 1140 and one or more output devices 1150, such as a speaker 1152 and a display 1154. Other possible output devices (not shown) can include piezoelectric or other haptic output devices. Some devices can serve more than one input/output function. For example, touchscreen 1132 and display 1154 can be combined in a single input/output device.

A wireless modem 1160 can be coupled to an antenna (not shown) and can support two-way communications between the processor 1110 and external devices, as is well understood in the art. The modem 1160 is shown generically and can include a cellular modem for communicating with the mobile communication network 1104 and/or other radio-based modems (e.g., Bluetooth 1164 or Wi-Fi 1162). The wireless modem 1160 is typically configured for communication with one or more cellular networks, such as a GSM or CDMA network for data and voice communications within a single cellular network, between cellular networks, or between the mobile device and a public switched telephone network (PSTN).

The mobile device 1100 can further include at least one input/output port 1180, a power supply 1182, a satellite navigation system receiver 1184, such as a Global Navigation Satellite System (GNSS) (e.g., Global Positioning System or GPS) receiver, an accelerometer 1186, and/or a physical connector 1190, which can be a USB port, IEEE 1394 (FireWire) port, and/or RS-232 port. The illustrated components 1102 are not required or all-inclusive, as any components can be deleted and other components can be added.

Example 36—Example Cloud-Supported Environment

Figure 12:
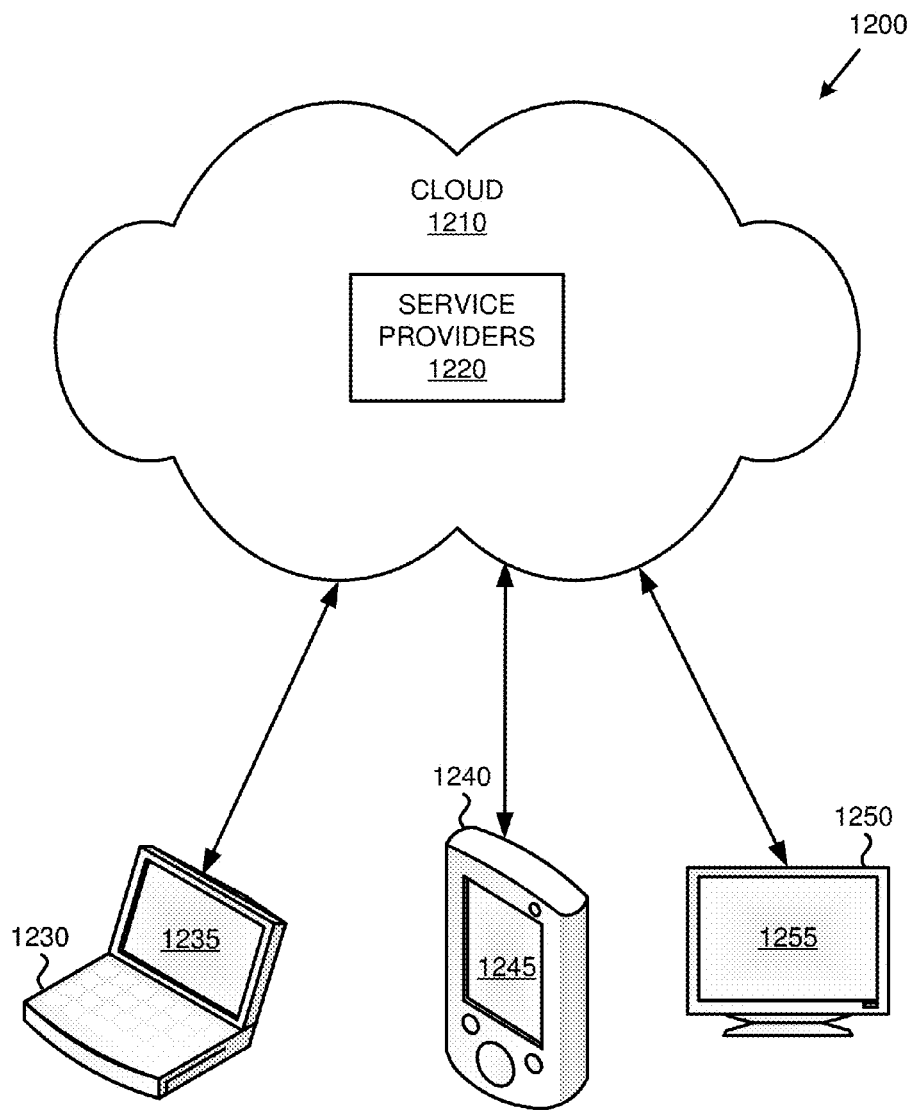
FIG. 12 is an example cloud-support environment that can be used in conjunction with the technologies described herein.

In example environment 1200 of FIG. 12, the cloud 1210 provides services for connected devices 1230, 1240, 1250 with a variety of screen capabilities. Connected device 1230 represents a device with a computer screen 1235 (e.g., a mid-size screen). For example, connected device 1230 could be a personal computer such as desktop computer, laptop, notebook, netbook, or the like. Connected device 1240 represents a device with a mobile device screen 1245 (e.g., a small size screen). For example, connected device 1240 could be a mobile phone, smart phone, personal digital assistant, tablet computer, and the like. Connected device 1250 represents a device with a large screen 1255. For example, connected device 1250 could be a television screen (e.g., a smart television) or another device connected to a television (e.g., a set-top box or gaming console) or the like. One or more of the connected devices 1230, 1240, 1250 can include touch screen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 1200. For example, the cloud 1210 can provide services for one or more computers (e.g., server computers) without displays.

Services can be provided by the cloud 1210 through service providers 1220, or through other providers of online services (not depicted). For example, cloud services can be customized to the screen size, display capability, and/or touch screen capability of a particular connected device (e.g., connected devices 1230, 1240, 1250).

In example environment 1200, the cloud 1210 provides the technologies and solutions described herein to the various connected devices 1230, 1240, 1250 using, at least in part, the service providers 1220. For example, the service providers 1220 can provide a centralized solution for various cloud-based services. The service providers 1220 can manage service subscriptions for users and/or devices (e.g., for the connected devices 1230, 1240, 1250 and/or their respective users).

Example 37—Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., non-transitory computer-readable media, such as one or more optical media discs, volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques as well as any data created and used during implementation of the disclosed embodiments can be stored on one or more computer-readable media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved.

Non-Transitory Computer-Readable Media

Any of the computer-readable media herein can be non-transitory (e.g., memory, magnetic storage, optical storage, or the like).

Storing in Computer-Readable Media

Any of the storing actions described herein can be implemented by storing in one or more computer-readable media (e.g., computer-readable storage media or other tangible media).

Any of the things described as stored can be stored in one or more computer-readable media (e.g., computer-readable storage media or other tangible media).

Methods in Computer-Readable Media

Any of the methods described herein can be implemented by computer-executable instructions in (e.g., encoded on) one or more computer-readable media (e.g., computer-readable storage media or other tangible media). Such instructions can cause a computing system to perform the method. The technologies described herein can be implemented in a variety of programming languages.

Methods in Computer-Readable Storage Devices

Any of the methods described herein can be implemented by computer-executable instructions stored in one or more computer-readable storage devices (e.g., memory, magnetic storage, optical storage, or the like). Such instructions can cause a computer to perform the method.

Other Embodiments

Clause 1. A method implemented comprising:
via one or more initial indoor-outdoor-status-determining factors, determining an indoor-outdoor status indicating whether a mobile computing device is indoors or outdoors;
detecting that the mobile computing device is approaching an indoor-outdoor transition;

responsive to detecting that the mobile computing device is approaching the indoor-outdoor transition, collecting one or more additional indoor-outdoor-status-determining factors; and via the one or more additional indoor-outdoor-status-determining factors, confirming or rejecting the indoor-outdoor status.

Clause 2. The method of clause 1 further comprising:

progressively collecting one or more further indoor-outdoor-status-determining factors and incorporating the one or more further indoor-outdoor-status-determining factors into indoor-outdoor status determination until a conclusive indoor-outdoor status is determined.

Clause 3. The method of clause 2 wherein:

the one or more further indoor-outdoor-status-determining factors comprise an activity detection;

the activity detection indicates a driving activity; and incorporating the activity detection into the indoor-outdoor status determination results in a conclusive outdoor indoor-outdoor status.

Clause 4. The method of any of clauses 1-3 wherein:

detecting that the mobile computing device is approaching an indoor-outdoor transition comprises determining that the mobile computing device has entered a bounding box associated with a venue associated with an indoor or outdoor status.

Clause 5. The method of clause 4 wherein:

the bounding box is drawn with boundaries to incorporate a venue buffer zone around a physical boundary of the venue.

Clause 6. The method of any of clauses 1-5 wherein:

detecting that the mobile computing device is approaching an indoor-outdoor transition comprises determining that the mobile computing device has entered a venue buffer zone associated with a venue.

Clause 7. The method of any of clauses 1-6 wherein:

at least one of the one or more initial indoor-outdoor-status-determining factors is collected via an outdoor positioning system;

at least one of the one or more additional indoor-outdoor-status-determining factors are collected via an indoor positioning system; and confirming or rejecting the indoor-outdoor status comprises resolving a conflict between the two positioning systems.

Clause 8. The method of any of clauses 1-7 wherein the indoor-outdoor status is confirmed, the method further comprising:

shutting down an indoor or outdoor positioning system based on the confirmed indoor-outdoor status.

Clause 9. The method of any of clauses 1-8 further comprising:

responsive to a conclusive determination of indoor-outdoor status, deactivating a service for collecting the one or more additional indoor-outdoor-status-determining factors.

Clause 10. The method of any of clauses 1-9 further comprising:

responsive to determining that the mobile computing device is approaching an indoor-outdoor transition, activating a service for collecting the one or more additional indoor-outdoor-status-determining factors.

Clause 11. The method of any of clauses 1-10 further comprising:

responsive to determining that the indoor-outdoor status exhibits characteristics of a possible false determination, activating at least one service for collecting one or more further additional indoor-outdoor-status-determining factors; and determining a revised indoor-outdoor status of the mobile computing device via the one or more further additional indoor-outdoor-status-determining factors.

Clause 12. The method of any of clauses 1-11 further comprising:

based on the indoor-outdoor status, choosing between an indoor positioning system and an outdoor positioning system; and determining a position of the mobile computing device via the chosen positioning system.

Clause 13. The method of any of clauses 1-12 further comprising:

receiving, from hardware of the mobile computing device, sensor data indicating a phenomenon detected by the hardware of the mobile computing device;

wherein at least one of the indoor-outdoor-status-determining factors is calculated from the sensor data.

Clause 14. The method of any of clauses 1-13 wherein:

the one or more additional indoor-outdoor-status-determining factors comprise an activity detection;

the activity detection indicates a change in activity to or from driving; and an indoor indoor-outdoor status is rejected based on the indicated change in activity to or from driving.

Clause 15. The method of any of clauses 1-14 wherein the additional indoor-outdoor-status-determining factors comprise one or more factors selected from the group consisting of:

detecting entry into or exit out of a geo-fence;

detection of current position within a bounding polygon associated with a venue;

a current position determined via dead reckoning;

a Wi-Fi signal signature;

activity detection;

device movement speed detection;

indoor-outdoor status determinations shared by another device for a location;

positioning request heuristics;

detection of a low energy beacon;

detection of short-range communications;

step counting;

detected light information from one or more sensors of the mobile computing device;

detected noise patterns from one or more sensors of the mobile computing device;

detected temperature from one or more sensors of the mobile computing device; or analysis results of audio, still images, or video of the mobile computing device.

Clause 16. The method of any of clauses 1-15 wherein detecting that the mobile computing device is approaching an indoor-outdoor transition comprises evaluating one or more indoor-outdoor-status-determining factors selected from the group consisting of:

detecting entry into or exit out of a geo-fence;

detection of current position within a bounding polygon associated with a venue;

a current position determined via dead reckoning;

a Wi-Fi signal signature;

activity detection;

device movement speed detection;

indoor-outdoor status determinations shared by another device for a location;

positioning request heuristics;

detection of a low energy beacon;
detection of short-range communications;
step counting;
detected light information from one or more sensors of the mobile computing device;
detected noise patterns from one or more sensors of the mobile computing device;
detected temperature from one or more sensors of the mobile computing device; or
analysis results of audio, still images, or video of the mobile computing device.

Clause 17. A mobile computing device comprising:
in one or more computer-readable storage media, a position determination tool comprising an indoor-outdoor status tracker;
wherein the position determination tool comprises a stored indoor-outdoor status indicating whether the mobile computing device is indoors or outdoors;
wherein the indoor-outdoor status tracker comprises a stored indoor-outdoor transition indicator indicating whether the mobile computing device is transitioning between an indoor and an outdoor status;
wherein the indoor-outdoor status tracker accepts one or more initial indoor-outdoor-status-determining factors as input for adjusting the stored indoor-outdoor status; and
wherein the indoor-outdoor status tracker is operable to request one or more additional indoor-outdoor-status-determining factors as input when the indoor-outdoor transition indicator indicates a transition; and
the indoor-outdoor status tracker is operable to confirm or reject the indoor-outdoor status based on the one or more additional indoor-outdoor-status-determining factors.

Clause 18. The mobile computing device of clause 17 further comprising:
a stored bounding box for a venue;
wherein the indoor-outdoor transition indicator is set according to whether the mobile computing device is within the stored bounding box.

Clause 19. The mobile computing device of clause 17 or 18 wherein:
the indoor-outdoor status tracker is operable to progressively request one or more further indoor-outdoor-status-determining factors as input when the additional indoor-outdoor-status-determining factors do not conclusively confirm or reject the indoor-outdoor status.

Clause 20. One or more computer-readable media comprising computer-executable instructions causing a mobile computing device to perform a method comprising:
storing a representation of a bounding box;
receiving a current position of the mobile computing device as determined by a first positioning service interpreting data provided by hardware of the mobile computing device;
determining whether the current position of the mobile computing device is within the bounding box;
responsive to determining that the current position of the mobile computing device is within the bounding box, activating a second positioning service;
based on the current position of the mobile computing device as determined by the first positioning service and a current position of the mobile computing device as determined by a second positioning service, determining an indoor-outdoor status of the mobile computing device; and
based on the determined indoor-outdoor status of the mobile computing device, deactivating a positioning service of the mobile computing device, whereby power consumption by the mobile computing device is reduced.

Alternatives

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. I therefore claim as my invention all that comes within the scope and spirit of the claims.

What is claimed is:
1. A method comprising:
via one or more initial indoor-outdoor-status-determining factors, determining an indoor-outdoor status indicating whether a mobile computing device is indoors or outdoors;
detecting that the mobile computing device is approaching an indoor-outdoor transition;
responsive to detecting that the mobile computing device is approaching the indoor-outdoor transition, collecting one or more additional indoor-outdoor-status-determining factors;
progressively collecting one or more further indoor-outdoor-status-determining factors and incorporating the one or more further indoor-outdoor-status-determining factors into indoor-outdoor status determination until a conclusive indoor-outdoor status is determined; and
via the one or more additional indoor-outdoor-status-determining factors and the one or more further indoor-outdoor-status-determining factors, confirming or rejecting the indoor-outdoor status;
wherein:
the one or more further indoor-outdoor-status-determining factors comprise an activity detection;
the activity detection indicates a moving activity; and
incorporating the activity detection into the indoor-outdoor status determination results in a conclusive outdoor indoor-outdoor status.

2. The method of claim 1 wherein:
the activity detection indicates a driving activity.

3. The method of claim 1 wherein:
detecting that the mobile computing device is approaching an indoor-outdoor transition comprises determining that the mobile computing device has entered a bounding box associated with a venue associated with an indoor or outdoor status.

4. The method of claim 3 wherein:
the bounding box is drawn with boundaries to incorporate a venue buffer zone around a physical boundary of the venue.

5. The method of claim 1 wherein:
detecting that the mobile computing device is approaching an indoor-outdoor transition comprises determining that the mobile computing device has entered a venue buffer zone associated with a venue.

6. The method of claim 1 wherein:
at least one of the one or more initial indoor-outdoor-status-determining factors is collected via an outdoor positioning system;
at least one of the one or more additional indoor-outdoor-status-determining factors are collected via an indoor positioning system; and confirming or rejecting the indoor-outdoor status comprises resolving a conflict between the two positioning systems.

7. The method of claim 1 wherein the indoor-outdoor status is confirmed, the method further comprising:
shutting down an indoor or outdoor positioning system based on the confirmed indoor-outdoor status.

8. The method of claim 1 further comprising:
responsive to a conclusive determination of indoor-outdoor status, deactivating a service for collecting the one or more additional indoor-outdoor-status-determining factors.

9. The method of claim 1 further comprising:
responsive to determining that the mobile computing device is approaching an indoor-outdoor transition, activating a service for collecting the one or more additional indoor-outdoor-status-determining factors.

10. The method of claim 1 further comprising:
responsive to determining that the indoor-outdoor status exhibits characteristics of a possible false determination, activating at least one service for collecting the one or more further additional indoor-outdoor-status-determining factors; and
determining a revised indoor-outdoor status of the mobile computing device via the one or more further additional indoor-outdoor-status-determining factors.

11. The method of claim 1 further comprising:
based on the indoor-outdoor status, choosing between an indoor positioning system and an outdoor positioning system; and
determining a position of the mobile computing device via the chosen positioning system.

12. The method of claim 1 further comprising:
receiving, from hardware of the mobile computing device, sensor data indicating a phenomenon detected by the hardware of the mobile computing device;
wherein at least one of the indoor-outdoor-status-determining factors is calculated from the sensor data.

13. The method of claim 1 wherein:
the one or more additional indoor-outdoor-status-determining factors comprise an activity detection;
the activity detection indicates a change in activity to or from driving; and
an indoor indoor-outdoor status is rejected based on the indicated change in activity to or from driving.

14. The method of claim 1 wherein the additional indoor-outdoor-status-determining factors comprise one or more factors selected from the group consisting of:
detecting entry into or exit out of a geo-fence;
detection of current position within a bounding polygon associated with a venue;
a current position determined via dead reckoning;
a Wi-Fi signal signature;
activity detection;
device movement speed detection;
indoor-outdoor status determinations shared by another device for a location;
positioning request heuristics;
detection of a low energy beacon;
detection of short-range communications;
step counting;
detected light information from one or more sensors of the mobile computing device;
detected noise patterns from one or more sensors of the mobile computing device;
detected temperature from one or more sensors of the mobile computing device; or
analysis results of audio, still images, or video of the mobile computing device.

15. The method of claim 1 wherein detecting that the mobile computing device is approaching an indoor-outdoor transition comprises evaluating one or more indoor-outdoor-status-determining factors selected from the group consisting of:
detecting entry into or exit out of a geo-fence;
detection of current position within a bounding polygon associated with a venue;
a current position determined via dead reckoning;
a Wi-Fi signal signature;
activity detection;
device movement speed detection;
indoor-outdoor status determinations shared by another device for a location;
positioning request heuristics;
detection of a low energy beacon;
detection of short-range communications;
step counting;
detected light information from one or more sensors of the mobile computing device;
detected noise patterns from one or more sensors of the mobile computing device;
detected temperature from one or more sensors of the mobile computing device; or
analysis results of audio, still images, or video of the mobile computing device.

16. A mobile computing device comprising:
in one or more computer-readable storage media, a position determination tool comprising an indoor-outdoor status tracker;
wherein the position determination tool comprises a stored indoor-outdoor status indicating whether the mobile computing device is indoors or outdoors;
wherein the indoor-outdoor status tracker comprises a stored indoor-outdoor transition indicator indicating whether the mobile computing device is transitioning between an indoor and an outdoor status;
wherein the indoor-outdoor status tracker accepts one or more initial indoor-outdoor-status-determining factors as input for adjusting the stored indoor-outdoor status; and
wherein the indoor-outdoor status tracker is operable to request one or more additional indoor-outdoor-status-determining factors as input when the indoor-outdoor transition indicator indicates a transition;
the indoor-outdoor status tracker is operable to progressively request one or more further indoor-outdoor-status-determining factors as input when the additional indoor-outdoor-status-determining factors do not conclusively confirm or reject the stored indoor-outdoor status; and
the indoor-outdoor status tracker is operable to confirm or reject the stored indoor-outdoor status based on the one or more additional indoor-outdoor-status-determining factors and the one or more further indoor-outdoor-status-determining factors.

17. The mobile computing device of claim 16 further comprising:
a stored bounding box for a venue;
wherein the indoor-outdoor transition indicator is set according to whether the mobile computing device is within the stored bounding box.

18. One or more computer-readable media comprising one or more nonvolatile memory components comprising computer-executable instructions causing a mobile computing device to perform a method comprising:

storing a representation of a bounding box;

receiving a current position of the mobile computing device as determined by a first positioning service interpreting data provided by hardware of the mobile computing device;

determining whether the current position of the mobile computing device is within the bounding box;

responsive to determining that the current position of the mobile computing device is within the bounding box, activating a second positioning service;

after collecting one or more initial indoor-outdoor-status-determining factors and one or more additional indoor-outdoor-status-determining factors, progressively collecting one or more further indoor-outdoor-status-determining factors and incorporating the one or more further indoor-outdoor-status-determining factors into an indoor-outdoor status determination until a conclusive indoor-outdoor status is determined;

based on the current position of the mobile computing device as determined by the first positioning service and a current position of the mobile computing device as determined by a second positioning service, determining an indoor-outdoor status of the mobile computing device; and based on the determined indoor-outdoor status of the mobile computing device, deactivating a positioning service of the mobile computing device, whereby power consumption by the mobile computing device is reduced.

19. The method of claim 1 wherein:

one or more of the indoor-outdoor-status-determining factors comprise speed of the mobile computing device.

20. The method of claim 3 wherein the method further comprises:

determining a speed of the mobile computing device, wherein the speed is one of the indoor-outdoor-status-determining factors; and determining whether the mobile computing device is approaching the bounding box based on the speed of the mobile computing device.

* * * * *